United States Patent
Ogasawara et al.

(10) Patent No.: US 7,453,787 B2
(45) Date of Patent: Nov. 18, 2008

(54) OPTICAL PICKUP

(75) Inventors: Masakazu Ogasawara, Tsurugashima (JP); Makoto Sato, Tsurugashima (JP); Ikuya Kikuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 302 days.

(21) Appl. No.: 10/593,649

(22) PCT Filed: Mar. 17, 2005

(86) PCT No.: PCT/JP2005/004755

§ 371 (c)(1),
(2), (4) Date: Sep. 21, 2006

(87) PCT Pub. No.: WO2005/093736

PCT Pub. Date: Oct. 6, 2005

(65) Prior Publication Data

US 2008/0232203 A1 Sep. 25, 2008

(30) Foreign Application Priority Data

Mar. 25, 2004 (JP) ............................. 2004-089073
Feb. 7, 2005 (JP) ............................. 2005-030950

(51) Int. Cl.
*G11B 7/00* (2006.01)

(52) U.S. Cl. .................................. 369/112.15; 369/121

(58) Field of Classification Search ............ 369/112.15
See application file for complete search history.

(56) References Cited

U.S. PATENT DOCUMENTS

| 5,526,338 A * | 6/1996 | Hasman et al. ................ 369/94 |
| 7,106,682 B2 * | 9/2006 | Ueyama et al. ........ 369/112.15 |
| 7,330,292 B2 * | 2/2008 | Komma ....................... 359/15 |

FOREIGN PATENT DOCUMENTS

| CN | 1180891 A | 5/1998 |
| JP | 2001-209966 | 8/2001 |
| JP | 2001-256667 | 9/2001 |
| JP | 2002-237081 | 8/2002 |
| JP | 2003-45048 | 2/2003 |
| JP | 2003-177226 | 6/2003 |
| JP | 2004-213854 | 7/2004 |
| WO | WO 03/075267 | 9/2003 |

* cited by examiner

*Primary Examiner*—Paul Huber
(74) *Attorney, Agent, or Firm*—Young & Thompson

(57) ABSTRACT

An optical pickup projects laser beams having the first to the third wavelengths, in response to the type of a recording medium which is an object to which recording or reproduction is to be performed, and reflecting light from the recording medium is received by a light-detecting element. In order to reduce the sizes of the optical pickup, light of the second and the third wavelengths is generated by a single dual-wavelength light source, and reflecting light of all the wavelengths is to be received by the single light-detecting element. A hologram element giving different optical effects to light of each wavelength is arranged between the light irradiating means and the light-detecting element. Thus, appropriate information recording and reproduction can be performed by using light of each wavelength.

13 Claims, 21 Drawing Sheets

IN CASE OF BD (WHEN BLUE WAVELENGTH IS USED)

IN CASE OF DVD (WHEN RED WAVELENGTH IS USED)

IN CASE OF CD (WHEN INFRARED WAVELENGTH IS USED)

|  | DIFFRACTION EFFICIENCY [%] | | GRATING DEPTH |
|---|---|---|---|
|  | 0th-ORDER LIGHT | ± 1st-ORDER LIGHT | $D[\lambda]$ |
| BLUE (405nm) | 100 | 0 | 3 |
| RED (660nm) | 41 | 26 | 1.89 |
| INFRARED (780nm) | 3 | 41 | 1.60 |

REFRACTIVE INDEX:
$n_{405}$ : 1.619
$n_{660}$ : 1.580
$n_{780}$ : 1.574

— 405nm 0th-ORDER LIGHT
······ 660nm 0th-ORDER LIGHT
— 780nm 0th-ORDER LIGHT
· · · · 405nm 1st-ORDER LIGHT
— 660nm 1st-ORDER LIGHT
· · · 780nm 1st-ORDER LIGHT

30b

HOLOGRAM AREA A
HOLOGRAM AREA B r ≒ APERTURE DIAMETER * 0.7

1st-ORDER LIGHT IN AREA A

0th-ORDER LIGHT IN AREAS A AND B

1st-ORDER LIGHT IN AREA B

Focus Error = (A1+A3) − (A2+A4)
RF = A1+A2+A3+A4
SPHERICAL ABERRATION = (B1+B3) − (B2+B4)

IN CASE OF BD (WHEN BLUE WAVELENGTH IS USED)

IN CASE OF DVD (WHEN RED WAVELENGTH IS USED)

IN CASE OF CD (WHEN INFRARED WAVELENGTH IS USED)

| | DIFFRACTION EFFICIENCY [%] | | GRATING DEPTH |
|---|---|---|---|
| | 0th-ORDER LIGHT | 1st-ORDER LIGHT | D[λ] |
| BLUE (405nm) | 90 | 5 | 14.1 |
| RED (660nm) | 93 | 3 | 8.1 |
| INFRARED (780nm) | 4 | 62 | 6.8 |

|  | DIFFRACTION EFFICIENCY [%] | | GRATING DEPTH |
|---|---|---|---|
|  | 0th-ORDER LIGHT | ±1st-ORDER LIGHT | D[λ] |
| BLUE (405nm) | 80 | 10 | 5.2 |
| RED (660nm) | 98 | 1 | 3 |
| INFRARED (780nm) | 2 | 41 | 2.5 |

| | DIFFRACTION EFFICIENCY [%] | | GRATING DEPTH |
| --- | --- | --- | --- |
| | 0th-ORDER LIGHT | ± 1st-ORDER LIGHT | D[λ] |
| BLUE (405nm) | 84 | 5 | 1.1 |
| RED (660nm) | 21 | 33 | 0.66 |
| INFRARED (780nm) | 2 | 41 | 0.55 |

30e

|  | DIFFRACTION EFFICIENCY [%] | | GRATING DEPTH |
|---|---|---|---|
|  | 0th-ORDER LIGHT | ±1st-ORDER LIGHT | D[λ] |
| BLUE (405nm) | 100 | 0 | 3 |
| RED (660nm) | 41 | 26 | 1.89 |
| INFRARED (780nm) | 3 | 41 | 1.60 |

OPTICAL PICKUP

This application is a 371 of PCT/JP05/04755, filed Mar. 17, 2005.

TECHNICAL FIELD

This invention relates to an optical pickup irradiating laser beams of plural wavelengths onto a recording medium.

BACKGROUND TECHNIQUE

There are known a CD and a DVD as an optical disc, and an information recording and reproduction apparatus (drive apparatus) capable of reading and writing information from and on both of them is spread. Wavelengths of laser beams used for recording and reproduction are different between the CD and the DVD. Therefore, as the above-mentioned drive apparatus, there is known one which uses an optical pickup of a two-wavelength compatibility type, equipped with a two-wavelength laser capable of emitting laser beams having a laser beam wavelength for the CD (substantially 780 nm, hereinafter also referred to as "infrared wavelength") and a laser beam wavelength for the DVD (substantially 660 nm, hereinafter also referred to as "red wavelength"). Generally, the two-wavelength laser is a package equipped with two-wavelength laser diodes (LDs).

On the optical pickup using the laser of the two wavelengths (i.e., a red wavelength and an infrared wavelength), a physical position of the LD of each wavelength on the optical pickup is different. Therefore, on the above-mentioned optical pickup, there is used an optical element for correcting a space between the two LDs in order to receive a returned light from the optical disc by a single light-detecting element. The optical element is formed by a diffraction element (hologram element), and has a function to make optical axes of the two-wavelength laser beams coincident with each other.

Optical pickups, using the two-wavelength lasers and having a function to adjust the optical axes of the returned light from the optical disc on an optical detector, are disclosed in Patent References-1 and 2, for example. The Patent Reference-2 discloses an element correcting a color aberration generated in a going path of the laser beam from a light source up to the recording medium and a positional shift of a laser emitting point, when the two-wavelength laser is used as the light source.

However, there is recently proposed a so-called Blu-ray disc (BD) as an optical disc using a much shorter laser beam (substantially 405 nm, hereinafter also referred to as "blue wavelength"). Therefore, the above-mentioned optical pickup of the two-wavelength compatibility type cannot be used in order to realize the compatible drive apparatus capable of reading and writing the information from and on the BD in addition to the CD and the DVD. Namely, an optical pickup of a three-wavelength compatibility type becomes necessary.

In addition, since a numerical aperture (NA) of the BD is larger than numerical apertures of the CD and the DVD, a large spherical aberration is problematically generated due to a thickness error of a cover layer of the disc. Therefore, in reproducing the BD, it may become necessary to provide a spherical aberration detecting function on the optical pickup in order to detect and correct the spherical aberration. An example of the optical pickup having the spherical aberration detecting function is disclosed in Patent Reference-3.

Patent Reference-1: Japanese Patent Application Laid-open under No. 2003-177226

Patent Reference-2: Japanese Patent Application Laid-open under No. 2002-237081

Patent Reference-3: Japanese Patent Application Laid-open under No. 2003-45048

DISCLOSURE OF INVENTION

The present invention has been achieved in order to solve the above problems. It is an object of this invention to provide an optical pickup capable of appropriately adjusting an optical axis of a laser beam and detecting a spherical aberration of a BD as need arises, in the optical pickup of a three-wavelength compatibility type using a two-wavelength laser.

According to one aspect of the present invention, there is provided an optical pickup including: a light source which emits a light of a first wavelength; a two-wavelength light source which emits lights of second and third wavelengths; a light irradiating unit which irradiates the lights of the first to third wavelengths on a recording medium; a single light-detecting element which receives reflected lights of the lights of the first to third wavelengths by the recording medium; and a hologram element which is arranged between the light irradiating unit and the light-detecting element, and which has a different optical effect on each of the lights of the first to third wavelengths.

The above optical pickup can be loaded on the drive apparatus having the compatibility to the BD, the DVD and the CD, for example. The first wavelength may be a blue wavelength for the BD, the second wavelength may be a red wavelength for the DVD and the third wavelength may be an infrared wavelength for the CD. In correspondence with a kind of recording medium subjected to the recording and reproduction, the optical pickup irradiates the laser beams of the first to third wavelengths onto the recording medium, and receives the reflected light from the recording medium by the light-detecting element. In order to miniaturize the optical pickup, the lights of the second and third wavelengths are generated by the single two-wavelength light source, and the reflected lights of all the wavelengths are received by the single light-detecting element. By arranging the hologram element having the different optical effects on the lights of the respective wavelengths between the light irradiation unit and the light-detecting element, it becomes possible to appropriately record and reproduce the information by using the lights of the respective wavelengths.

In a manner of the above optical pickup, the two-wavelength light source may emit the lights of the second and third wavelengths from different emitting points; and the hologram element may introduce 0th-order lights of the lights of the first and second wavelengths to a center of the light-detecting element and may introduce a diffracted light of the light of the third wavelength to the center of the light-detecting element.

Since the two-wavelength light source uses two light emitting diodes physically independent (e.g., the LD), the optical axes of the lights of the two wavelengths emitted from the two-wavelength light source are shifted. Then, by using the hologram element, both of the lights are introduced to the center of the single light-detecting element. Concretely, the 0th-order light of the second wavelength light and the diffracted light of the third wavelength light are introduced to the center of the light-detecting element. In addition, the light source emitting the first wavelength light and the two-wavelength light source are arranged so that the first wavelength light and the second wavelength light are irradiated to the center of the light-detecting element. Thereby, the three-wavelength lights can be detected by the single light-detecting element.

In a manner of the above optical pickup, the hologram element may diffract the light of the second wavelength and may introduce a 0th-order light of light intensity smaller than light intensity irradiated to the hologram element to the light-detecting element. For example, when the recording medium is the DVD, the recording power is large, a reflection ratio of the recording medium is high and sensitivity of the light-detecting element is high. Thus, the output of the light-detecting element can be saturated. Then, if the light intensity of the second wavelength light irradiated to the light-detecting element is reduced by the hologram element, it can be prevented that the output of the light-detecting element is saturated.

In another manner of the above pickup, the hologram element may diffract the light of the third wavelength and introduces the 1st-order light of light intensity smaller than light intensity irradiated to the hologram element to the light-detecting element. When the recording medium is the CD, for example, since the recording power is large, the reflection ratio of the recording medium is high and the sensitivity of the light-detecting is high, the output of the light-detecting element can be saturated. If the light intensity of the third wavelength light irradiated to the light-detecting element can be reduced by the hologram element, it can be prevented that the output of the light-detecting element is saturated.

In another manner of the above optical pickup, the hologram element may transmit the light of the first wavelength and may introduce a 0th-order light of light intensity equal to light intensity irradiated to the hologram element to the light-detecting element. For example, when the recording medium is the BD, the reflection ratio of the recording medium is lower as compared with the cases of the DVD and the CD, and the sensitivity of the light-detecting element is also lower. Therefore, the hologram element is configured to irradiate the first wavelength light onto the light-detecting element without attenuating it. Thereby, the S/N of the first wavelength light can be ensured.

In another manner of the above optical pickup, the hologram element may include an inner area formed into a circle and an outer area formed in a concentric circle with the inner area in an outer circumference of the inner area, and may divide the light irradiated to the hologram into a light passing through the inner area and a light passing through the outer area.

In the case of the BD, since a numerical aperture (NA) is large, the large spherical aberration occurs due to the thickness error of the cover layer of the recording medium. Therefore, it is necessary to detect and correct the spherical aberration. Then, it becomes possible to form the inner area and the outer area formed into the concentric circle on the hologram element and detect the spherical aberration by using the light transmitting the inner area. In a preferred example, a radius of the inner area may be substantially 70% of a light flux diameter formed in such a case that a light of a shortest wavelength of the first to third wavelengths is irradiated to the hologram element.

In another manner, the above optical pickup may further include a spherical aberration detecting light-detecting element which is provided separately from the light-detecting element, wherein the inner area of the hologram element diffracts a light of a shortest wavelength of the first to third wavelengths and introduces a diffracted light to the spherical aberration correcting light-detecting element. Thereby, the spherical aberration of the light of the shortest wavelength can be detected.

In a preferred example, the inner area and the outer area of the hologram element may be formed by gratings having same depths and different pitches.

In another manner of the above optical pickup, the hologram element may have a lens effect and a deflection effect to the light of the second wavelength, and may generate ±1st-order lights of the light of the second wavelength and reduce light intensity of the 0th-order light of the light of the second wavelength. Further, the hologram element may correct an optical axis shift between the lights of the first and second wavelengths irradiated to the light-detecting element and the light of the third wavelength, and may correct a color aberration generated in the light of the third wavelength. Thus, by reducing the light intensity of the second wavelength light irradiated to the light-detecting element, it can be prevented that the output of the light-detecting element is saturated. In addition, when the laser beam of the second wavelength is used, by the lens effect of the hologram element, it becomes possible to perform the focus error detection by a differential spot size method by using the ±1st-order lights. Further, when the laser beam of the third wavelength is used, it becomes possible to correct the color aberration by the lens effect of the hologram element.

In a preferred example, the hologram element may be a part of a diffraction grating formed into a circular-arc shape of plural concentric circles, and may be formed by a part eccentric with respect to a center of the concentric circles by amount corresponding to correction amount of the optical axis shift.

In addition, the first wavelength may be shorter than the second wavelength, and the second wavelength may be shorter than the third wavelength.

BRIEF DESCRIPTION OF THE REFERENCE NUMBER

Figure 1:
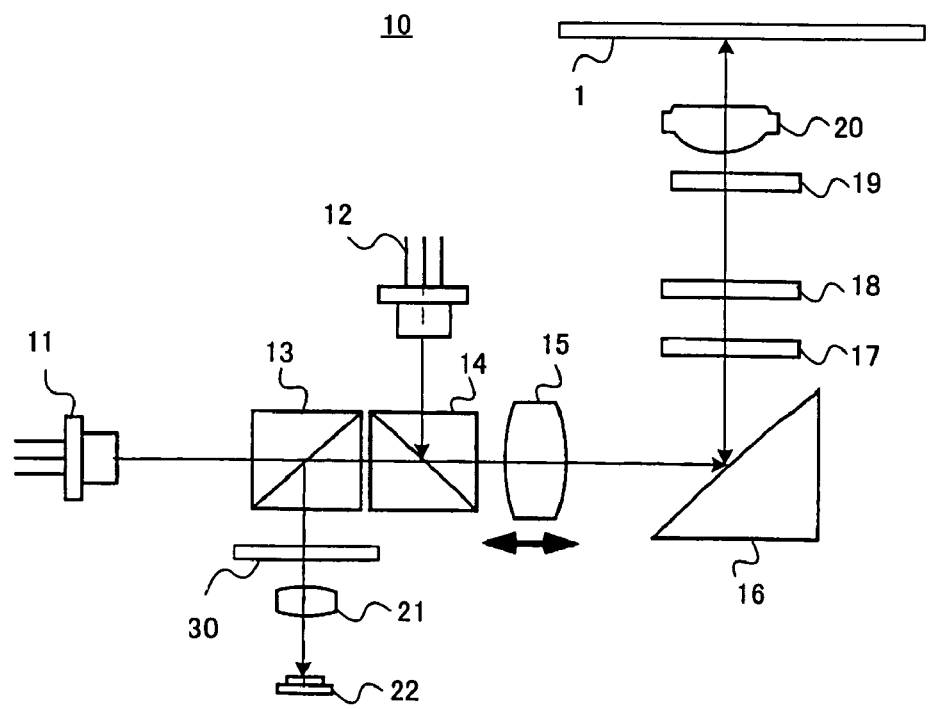
FIG. 1 is a block diagram schematically showing a configuration of an optical pickup according to an embodiment of the present invention.

1 Optical disc
10 Optical pickup
11 and 12 Laser beam sources
17 Liquid crystal panel
20 Objective lens
21 Condensing lens
22 Detector
22a RF signal detector
22b Spherical aberration detector
22d Detector for differential spot size method
30 Hologram element

DETAILED DESCRIPTION OF THE PREFERRED EMBODIMENTS

The preferred embodiments of the present invention will now be described below with reference to the attached drawings.

[Configuration of Optical Pickup]

FIG. 1 schematically shows the configuration of the optical pickup according to an embodiment of the present invention. In FIG. 1, an optical pickup 10 is an optical pickup of a compatibility type with three wavelengths capable of irradiating the laser beams for the BD, the DVD and the CD on the optical disc. The optical pickup 10 includes a blue LD (Laser Diode) 11 emitting the laser beam for the BD and a two-wavelength (red/infrared) LD 12 emitting the laser beams for the DVD and the CD, as the light source.

The laser beam of the wavelength 405 nm, which is emitted from the blue LD 11, passes through a polarization beam splitter (PBS) 13 and a dichroic/PBS prism 14 to be made a parallel light by a collimator lens 15. The light is directed to the direction of the disc 1 by a mirror 16. Then, via a spherical aberration correcting liquid crystal panel 17, a ¼ wavelength plate 18 corresponding to three wavelengths and a compatible element 19, the laser beam is irradiated onto a recording surface of the disc 1 by an objective lens 20 serving as a light irradiation unit. The liquid crystal panel 17 gives an appropriate phase difference to the laser beam by a bias voltage and a correction voltage given from the external. The ¼ wavelength plate 18 converts the laser beam received from the liquid crystal panel 17 from a linearly polarized light to a circularly polarized light. The compatible element 19 performs adjustment of the numerical aperture and the correction of the aberration in correspondence with differences of the wavelengths of the laser beams for the BD, the DVD and the CD and differences of the thicknesses of the respective discs for the BD, the DVD and the CD. The compatible element 19 is made of a hologram lens, for example.

In addition, the laser beam for the DVD or the CD emitted from the two-wavelength laser 12 is reflected to the direction of the collimator lens 15 by the dichroic/PBS prism 14 to be irradiated onto the optical disc 1 in the same path as that of the laser beam for the BD.

Meanwhile, the laser beam reflected by the optical disc 1 passes through the compatible element 19, the ¼ wavelength plate 18 and the liquid crystal panel 17, and the direction of the laser beam is changed by the mirror 16. After passing through the collimator lens 15 and the dichroic/PBS prism 14, the laser beam is directed to the direction of a detector 22 by the PBS 13. The optical axis of the laser beam received from the PBS 13 is adjusted by the hologram 30, and the laser beam is condensed onto the detector 22 via a condensing lens 21.

The light irradiated onto the detector 22 is photo-electrically converted into an electric signal, from which a reproduction signal and a servo error signal are generated. The present invention has a characteristic in a configuration of the hologram element 30 and a function thereof.

[Three-Wavelength Type Optical Pickup]

In the present invention, in the optical pickup using three different wavelengths as the light source, the reflected light from each recording medium is received by using one light-detecting element, and a hologram 30 having optical effects different in each of the wavelengths is arranged between the objective lens and the light-detecting element. As shown in FIG. 1, two of the three-wavelength laser beams are emitted from the so-called two-wavelength laser in which two laser sources are mounted on one package. Positions of emitting points of the two-wavelength lasers are generally different. In a case of the two-wavelength laser for DVD/CD, there is a space of substantially 110 μm between the emitting points thereof.

In the present invention, a semiconductor laser having a wavelength about 405 nm is used for the light source for the BD, and two-wavelength laser including a semiconductor laser having a wavelength about 660 nm and a semiconductor laser having a wavelength about 780 nm is used for the light sources for the DVD and the CD.

Next, a description will be given of requirements for the three-wavelength type optical pickup according to the present invention. In the three-wavelength type optical pickup, it is necessary that all of the blue wavelength laser beam for the BD, the red wavelength laser beam for the DVD and the infrared wavelength laser beam for the CD are accurately irradiated on the disc. At the same time, it is necessary to accurately condense the returned light from the disc on a light-detecting surface of the detector. Thus, it is necessary to design the hologram element 30 in consideration of the differences of the respective characteristics of the BD, the DVD and the CD, which will be described below.

As described above, as the used laser beam wavelength, the blue wavelength (also referred to as "first wavelength") $\lambda 1$ of substantially 405 nm is used for the BD, the red wavelength (also referred to as "second wavelength") $\lambda 2$ of substantially 660 nm is used for the DVD. Similarly, the infrared wavelength (also referred to as "third wavelength") $\lambda 3$ of substantially 780 nm is used for the CD. Namely, there is a relation among the laser wavelengths as follows.

$\lambda 1(BD) < \lambda 2(DVD) < \lambda 3(CD)$

Next, as the numerical apertures NA of the discs, the numerical aperture NA1 for the BD is substantially 0.85, the numerical aperture NA2 for the DVD is substantially 0.65, and the numerical aperture NA3 for the CD is substantially 0.45. Namely, there is a relation among the numerical apertures as follows.

NA1(BD)>NA2(DVD)>NA3(CD)

In addition, when the returned light from the disc is received by the light-detecting element (detector), aperture diameters of the respective laser beams on the detector are shown below. It is prescribed that the aperture diameters for the BD, the DVD and the CD are indicated as r1, r2 and r3, respectively.

r1>r2>r3

In view of the respective characteristics of the laser beams, design requirements for the hologram element 30 are below.

(Requirement-1)

It is necessary to use the two-wavelength laser obtained by integrally mounting the semiconductor laser oscillating the red wavelength $\lambda 2$ and the semiconductor laser oscillating the infrared wavelength $\lambda 3$ for the purpose of miniaturization of the entire optical pickup. If the two-wavelength laser is used, since emitting points of the laser beams of the two wavelengths are apart from each other, it is necessary to correct the shift of the optical axis of each laser beam on the detector.

(Requirement-2)

In the BD using the laser beam of the blue wavelength $\lambda 1$, a reflectance of the disc is lower than reflectances of the DVD and the CD, and sensitivity of the detector is also smaller. Therefore, it is desired that the light intensity irradiated to the detector is as large as possible.

(Requirement-3)

In the DVD using the laser beam of the red wavelength $\lambda 2$, the recording power is large, and the reflectance of the disc is also high. Further, since the sensitivity of the detector is high, the output of the detector is sometimes saturated. Thus, it is desired that the light intensity irradiated to the detector is reduced to some extent.

(Requirement-4)

In the CD using the laser beam of the infrared wavelength $\lambda 3$, the recording power is large, and the reflectance of the disc is also high. Further, since the sensitivity of the disc is high, the output of the detector is largely saturated. Hence, it is desired that the light intensity irradiated to the detector is reduced.

(Requirement-5)

In the BD using the laser beam of the blue wavelength $\lambda 1$, since the numerical aperture NA1 is large, the large spherical aberration is generated due to the thickness error of the cover layer of the disc. Therefore, it is necessary to detect and correct the spherical aberration.

A description will be given of embodiments of the hologram element satisfying the requirements.

First Embodiment

Figure 2:
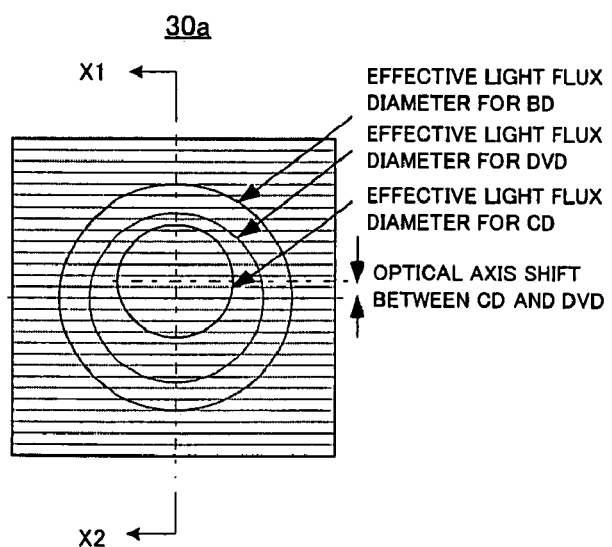
FIG. 2 is a plane view of a hologram element according to a first embodiment.
Figure 4A:
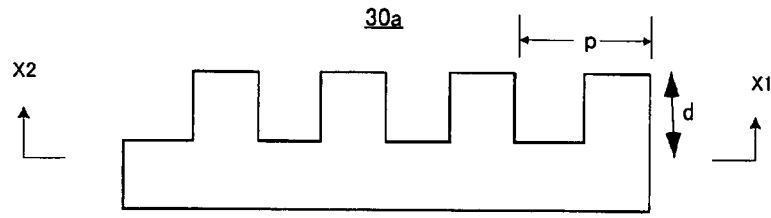
FIG. 4A is a partly-cross-sectional view of the hologram element according to the first embodiment.

FIG. 2 is a plane view of a three-wavelength hologram element 30a according to a first embodiment, and FIG. 4A is a cross-sectional view of the hologram element 30a taken along the line X1-X2 shown in FIG. 2. The hologram element 30a shown in FIG. 4A is a two-level hologram having two levels. In FIG. 4A, a pitch p of a grating of the hologram element 30a is determined as a size for correcting an optical axis shift between the laser beams of the blue wavelength and the red wavelength and the laser beam of the infrared wavelength on the detector 22. In addition, the grating depth d is determined such that no diffracted light is generated in the blue wavelength (i.e., only the 0th-order light is generated), the efficiency of the 0th-order light is reduced in the red wavelength and the efficiency of the ±1st-order light is increased in the infrared wavelength.

A description will be given of the operation of the hologram element 30a in each wavelength, with reference to FIGS. 3A to 3C.

Figure 3A:
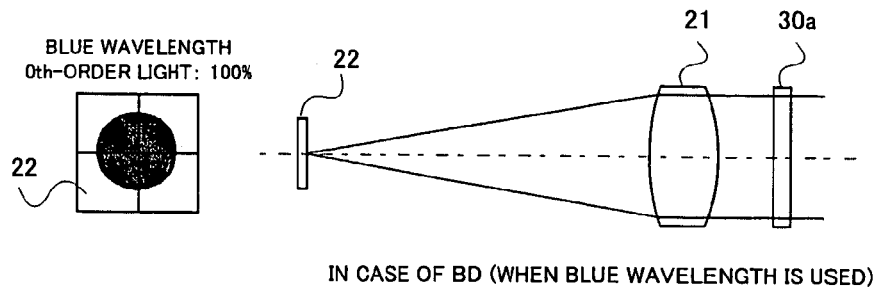
FIG. 3A is a diagram showing such a state that a laser beam of each wavelength is condensed onto a detector by the hologram element of the first embodiment.

(1) When Media Using Blue Wavelength $\lambda 1$ (BD, 405 nm) is Recorded and Reproduced FIG. 3A shows such a state that the blue wavelength laser beam is condensed onto the detector by the hologram element 30a of the first embodiment. As shown, the blue wavelength laser beam passes through the hologram element 30a to be condensed onto the detector 22 by the condensing lens 21. As shown on the left side of FIG. 3A, the light-detecting surface of the detector 22 is divided into four parts, and a spot of the blue wavelength laser beam is formed at a substantial center thereof. The detector 22 is a detector for detecting the RF signal and the servo signal (hereinafter, simply referred to as "detector for RF signal").

As for the blue wavelength, since the sensitivity of the detector is low in theory, it is necessary to consider S/N important. Therefore, it is necessary to enhance the efficiency of the detecting system and make the light intensity irradiated to the detector as large as possible. Hence, with respect to the blue wavelength laser beam, the hologram element 30a is formed so that it does not operate or so that the occurrence of the diffracted light is suppressed as much as possible.

(2) When Media Using Red Wavelength λ2 (DVD, 660 nm) is Recorded and Reproduced

Figure 3B:
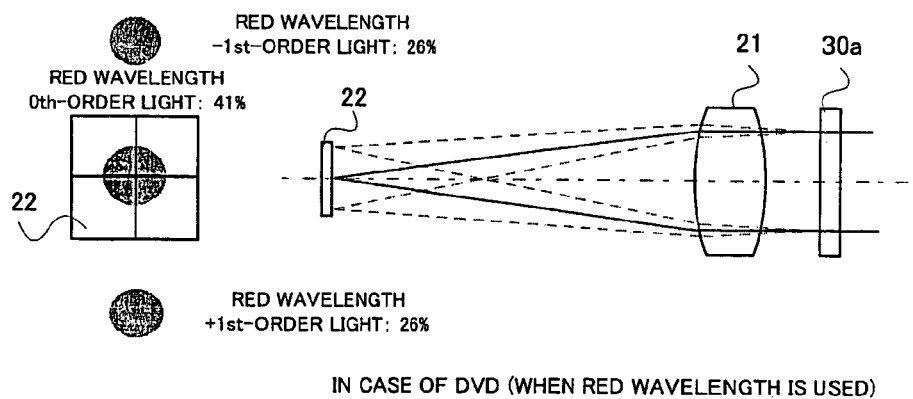
FIG. 3B is a diagram showing such a state that the laser beam of each wavelength is condensed onto the detector by the hologram element of the first embodiment.

FIG. 3B shows such a state that the red wavelength laser beam is condensed onto the detector by the hologram element 30a of the first embodiment. As shown, the hologram element 30a generates the ±1st-order lights of the red wavelength laser beam. In the red wavelength, the sensitivity of the detector is high, and the light intensity at the time of recording and reproduction is also large. Therefore, it is necessary to lower the efficiency of the detecting system and reduce the light intensity irradiated to the detector in order to prevent the saturation of the light-detecting element of the detector 22. Hence, the ±1st-order lights are generated by the hologram element 30a, and the light intensity of the 0th-order light irradiated to the detector 22 is reduced by the intensity of the ±1st-order lights.

Figure 3C:
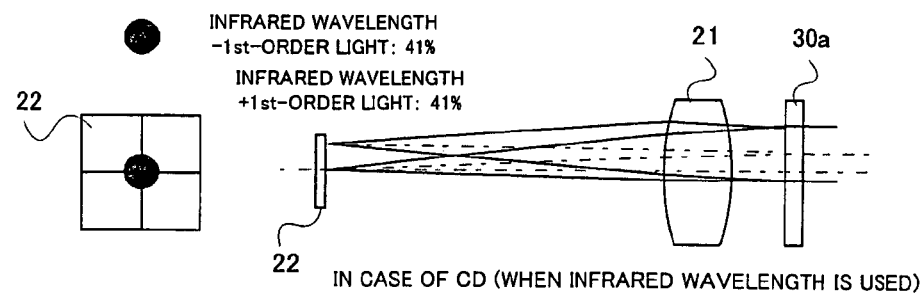
FIG. 3C is a diagram showing such a state that the laser beam of each wavelength is condensed onto the detector by the hologram element of the first embodiment.

(3) When Media Using Infrared Wavelength λ3 (CD, 780 nm) is Recorded and Reproduced FIG. 3C shows such a state that the infrared wavelength laser beam is condensed onto the detector by the hologram element 30a of the first embodiment. As shown, the hologram element 30a generates only the ±1st-order lights of the infrared wavelength laser beam and irradiates the +1st-order light or the −1st-order light on the detector 22. Thereby, it becomes possible to correct the optical axis shift in such a case that the two-wavelength laser is used.

Figure 4B:
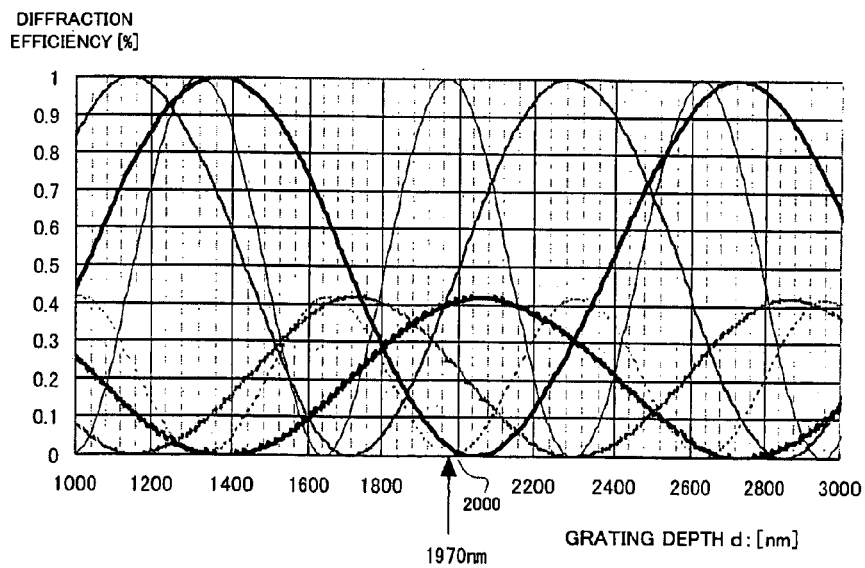
FIG. 4B is a graph showing a relation between a grating depth and a diffraction efficiency of the hologram element, according to the first embodiment.

FIG. 4A shows a configuration example of the hologram element 30a realizing the above-mentioned functions. The hologram element 30a is the two-level hologram having the single grating depth d. FIG. 4B shows a relation between the grating depth d and the diffraction efficiency of the hologram element 30a. In FIG. 4B, the above-mentioned functions can be realized by setting the grating depth d to 1970 nm. FIGS. 3A to 3C and FIG. 4A show the diffraction efficiency of the hologram element 30a with respect to the laser beam of each wavelength and the grating depth D with respect to the laser beam of each wavelength (converted to indicate how many wavelengths the grating depth d corresponds to), at the grating depth d=1970 nm. The grating depth D with respect to the laser beam of each wavelength can be obtained by an equation below.

$$D = \text{grating depth}(d) \times (\text{refractive index}(n)-1)/\text{wavelength of laser beam}$$

For example, in the case of the blue wavelength laser beam, the grating depth D is as follows.

$$D = 1970 \text{ (nm)} \times (1.619-1)/405 \text{ (nm)} = \text{substantially } 3\lambda$$

As shown in FIG. 4B, with respect to the blue wavelength laser beam, the grating depth d(=1970 nm) of the hologram element 30a corresponds to three wavelengths (3λ). Thus, ±1st-order lights (diffracted lights) are not generated in the blue wavelength laser beam, and the 0th-order light becomes 100%. Hence, the blue wavelength laser beam irradiated to the detector 22 can be maximum. Thereby, the Requirement-2 is satisfied.

With respect to the red wavelength laser beam, the grating depth d of the hologram element 30a corresponds to 1.89 wavelengths, and the 0th-order light of substantially 41% and the ±1st-order lights of substantially 26% are generated. Therefore, the red wavelength laser beam irradiated to the detector 22 can be reduced to 41%, and the saturation of the detector can be prevented. Thereby, the Requirement-3 is satisfied.

With respect to the infrared wavelength laser beam, the grating depth d of the hologram element 30a corresponds to 1.60 wavelengths, and the 0th-order light of 3% and the ±1st-order lights of 41% are generated. Namely, substantially only the ±1st-order lights can be generated and irradiated to the detector 22. Thereby, it becomes possible that the optical axis shift of the infrared wavelength laser due to using the two-wavelength laser is corrected, and the Requirement-1 is satisfied. In addition, the light intensity irradiated to the detector 22 can be reduced, and the Requirement-4 is satisfied.

Second Embodiment

Next, a description will be given of the hologram element according to a second embodiment. The configuration of the optical pickup itself in the second embodiment is similar to that shown in FIG. 1.

The second embodiment satisfies the above-mentioned Requirement-5 related to the detection of the spherical aberration. First, a detecting principle of the spherical aberration will be explained.

Figure 5:
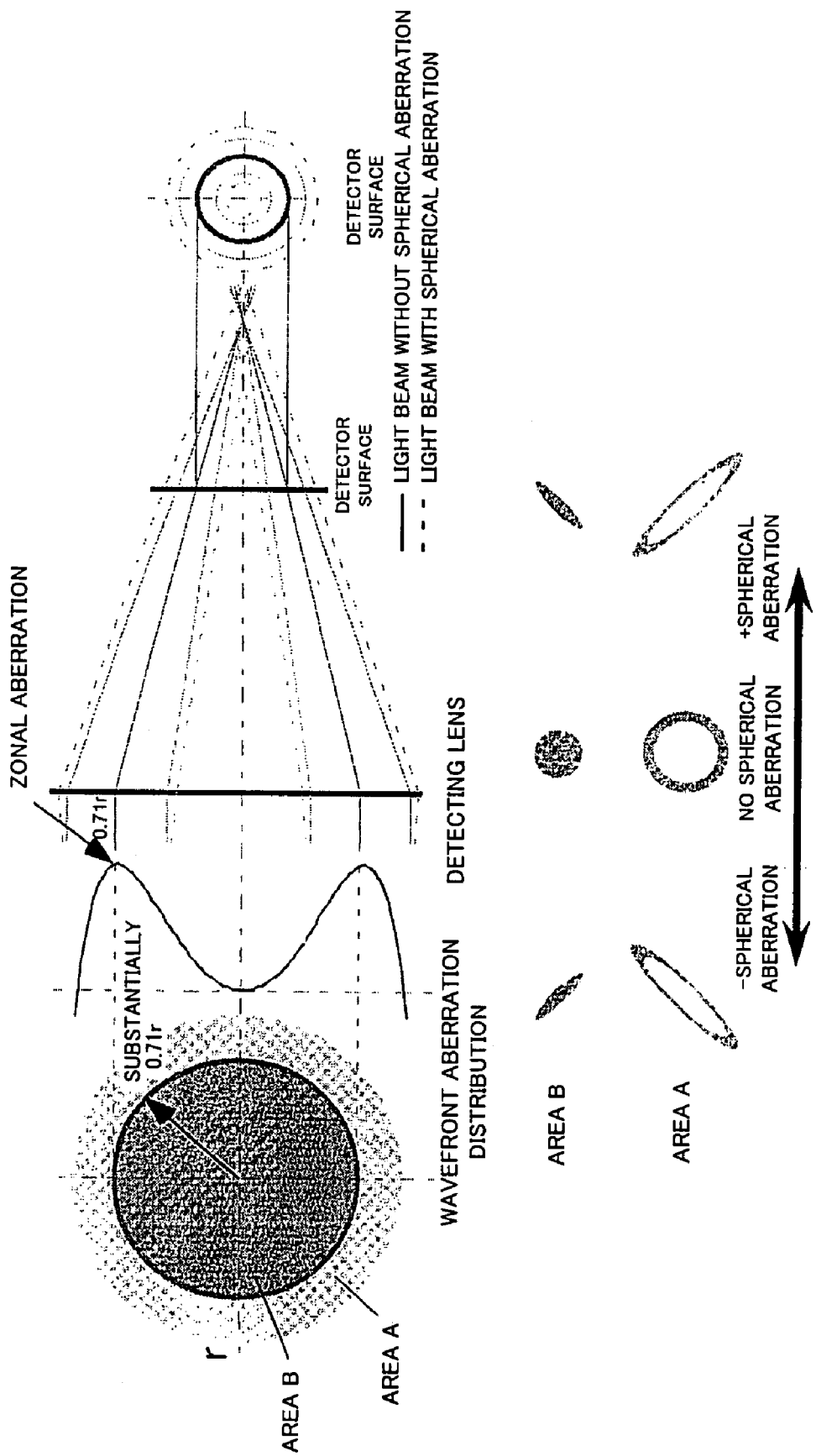
FIG. 5 is a diagram showing a detecting principle of a spherical aberration.

Due to the thickness error of the cover layer of the disc, the spherical aberration occurs to the optical disc. As shown in FIG. 5, the wavefront aberration distribution shape of the spherical aberration is formed into an "M" shape. The light beam on the inner side with respect to the zonal aberration having the largest aberration of the light beams passing through the aperture condenses on the inner side with respect to the original condensing position. The light beam on the outer side condenses on the outer side with respect to the original condensing position. The behavior of the light beam becomes opposite, based on whether the cover layer of the disc is thicker or thinner than the setting value of the objective lens.

Figure 6:
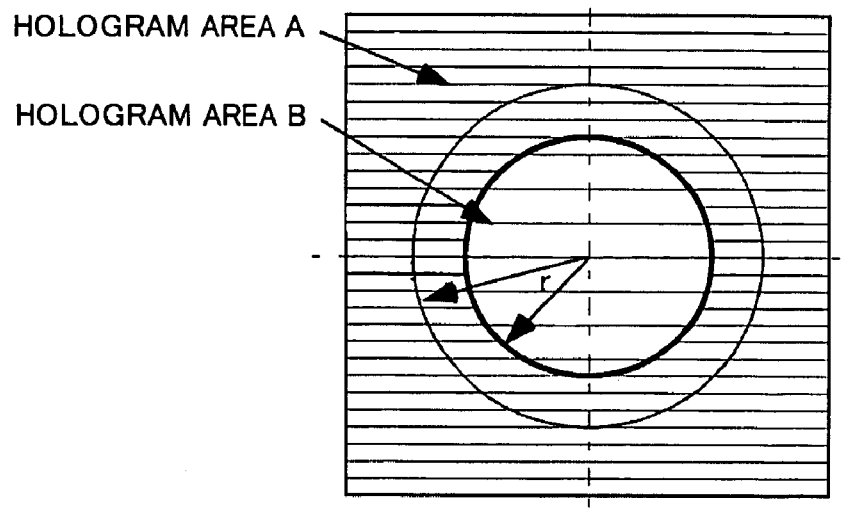
FIG. 6 is a plane view of the hologram element used for detecting the spherical aberration.

In order to detect this phenomenon by the detector, the light beam transmitting the inner side and the light beam transmitting the outer side with respect to the position of the zonal aberration may be separated and detected. For example, by using the hologram element, the polarization states of the light beam in the outer side and the light beam on the inner side are varied to be irradiated to different detectors. FIG. 6 is a plane view showing a configuration example of the hologram element capable of detecting the spherical aberration. The hologram is configured by two areas formed into concentric-circle shapes, i.e., a hologram area B on the inner side and a hologram area A on the outer side. The separation radiuses of the hologram areas A and B are set to substantially 70% (position of zonal aberration) of the light flux diameter of the transmissive light beam.

Figure 7:
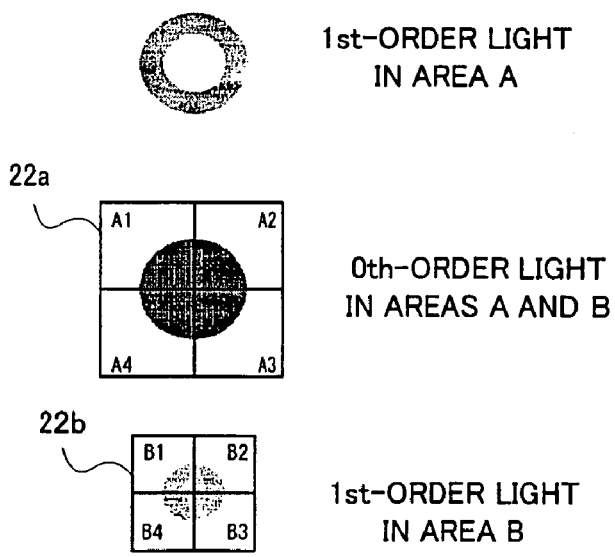
FIG. 7 is a plane view showing an example of the detector used for detecting the spherical aberration.

The normal detecting optical system for the servo error can be used. For example, in an astigmatism method, by combining the cylindrical lens and the condense lens and using a quadruple detector, the servo error can be obtained. FIG. 7 shows the configuration example of the detector capable of detecting the spherical aberration. As the detector, there are prepared a detector 22b (hereinafter, also referred to as "spherical aberration detector") used for the spherical aberration detection and a detector 22a (hereinafter, also referred to as "RF signal detector") used for reproduction of the RF signal and generation of the focus and tracking errors. Operations of various kinds of error signals are as shown in each equation shown in FIG. 7.

Figure 8:
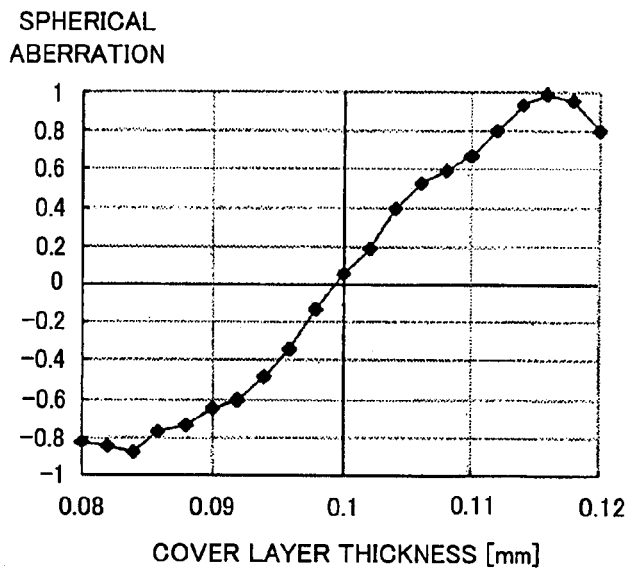
FIG. 8 is a graph showing a detected result of the spherical aberration of a blue wavelength laser beam.

FIG. 8 shows an example of a relation between the thickness of the cover layer of the disc and the spherical aberration error. In a graph shown in FIG. 8, a peak of the spherical aberration error is normalized to "1". As shown in FIG. 8, as the thickness of the cover layer of the disc becomes larger, the spherical aberration error becomes larger.

In FIG. 7, there is not provided the detector receiving the light beam of the outer peripheral portion with respect to the border between the hologram areas A and B, which is for the purpose of simplification. Thus, such a detector may be provided. The light intensity of light beam used for the spherical aberration detection can be controlled by operating the diffraction efficiency of the hologram. If the light intensity of 0th-order diffracted light (a light-detecting no diffraction effect, hereinafter referred to as "0th-order light") which is not used for the spherical aberration detection is set large, the light intensity irradiated to the detector 22a for obtaining the RF signal becomes large. Therefore, the S/N of the reproduction signal can be ensured. Generally, since the thickness error of the cover layer of the disc is a low frequency element, the servo frequency band of the spherical aberration correction may be low. Hence, since the amplification in the detector can be large, the slight light intensity of spherical aberration detecting signal is sufficient.

Figure 9:
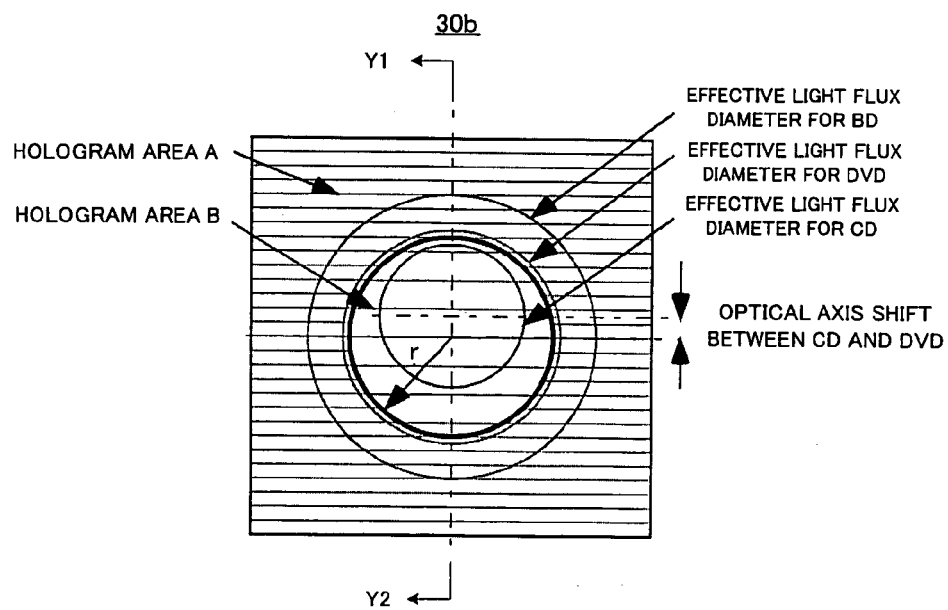
FIG. 9 is a plane view of the hologram element according to a second embodiment.
Figure 11:
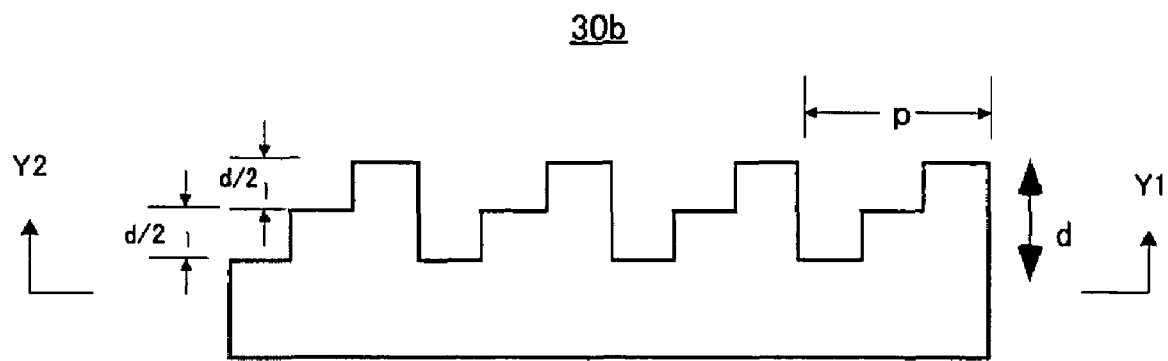
FIG. 11 is a partly-cross-sectional view of the hologram element according to the second embodiment.

Next, a description will be given of the configuration of the hologram element 30b used in the second embodiment. FIG. 9 is a plane view of the hologram element 30b according to the second embodiment, and FIG. 11 is a partly-cross-sectional view of the hologram element 30b taken along the line Y1-Y2 shown in FIG. 9.

As shown in FIG. 9, the hologram element 30b includes the two areas formed into the concentric-circle shapes, i.e., the hologram area B on the inner side and the hologram area A on the outer side. The hologram element 30b has a function to separate the light flux transmitting it into the hologram area B, formed into the circular shape on the inner side, and the light flux transmitting the hologram area A formed into a doughnut shape on the outer side. The radius of the concentric-circle is set so that the blue wavelength $\lambda 1$ (for the BD, substantially 405 nm) used for the optical pickup becomes substantially 70% of the light flux diameter at the position transmitting the hologram element 30b. Both of the hologram areas A and B of the hologram element 30b have the cross-sectional configurations shown in FIG. 11. However, the pitches p are different between the hologram areas A and B.

Next, a description will be given of the operation of the hologram element 30b in each of the wavelengths, with reference to FIGS. 10A to 10C.

Figure 10A:
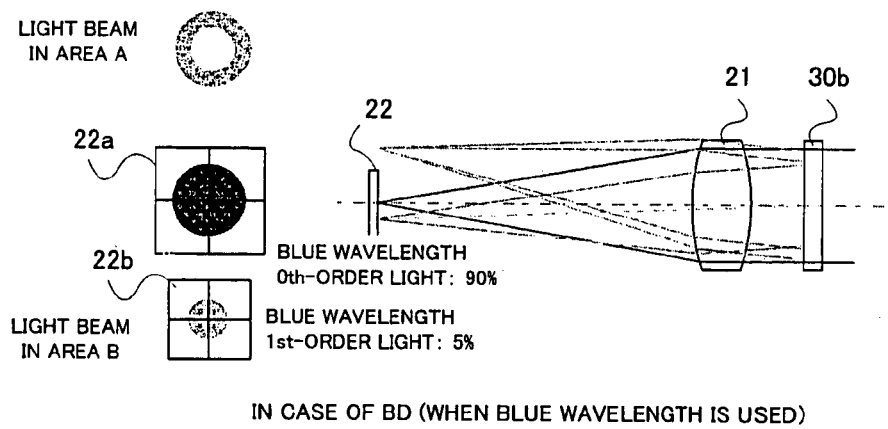
FIG. 10A is a diagram showing such a state that the laser beam of each wavelength is condensed onto the detector by the hologram element of the second embodiment.

(1) When Media Using Blue Wavelength $\lambda 1$ (BD, 405 nm) is Recorded and Reproduced FIG. 10A shows such a state that the blue wavelength laser beam is condensed onto the detector by the hologram element 30b of the second embodiment. The detector includes the RF signal detector 22a and the spherical aberration detector 22b. The reflected light from the disc is divided into three light fluxes by the hologram element 30b. They are the 1st-order diffracted light (also referred to as "1st-order light") transmitting the hologram area A, the 1st-order diffracted light transmitting the hologram area B, and the 0th-order diffracted light transmitting all the areas. The 1st-order diffracted lights transmitting the hologram areas A and B of the light beams irradiated to the hologram element 30b are deflected by the hologram element 30b, respectively. The grating depth d of the hologram element is set so that the 1st-order diffracted light and the 0th-order diffracted light of the blue wavelength laser beam are 5% and 90%, respectively. The 1st-order diffracted light, transmitting the hologram area B and deflected by the deflection effect, is irradiated to the spherical aberration detector 22b. Meanwhile, the 1st-order diffracted light, transmitting the hologram area A and deflected by the deflection effect, is not irradiated to any detectors. The 0th-order light which is not deflected by the deflection effect is irradiated to the RF signal detector 22a.

When the disc cover layer has the thickness error and the spherical aberration occurs, the laser beam received by the spherical aberration detector 22b is distorted. By operating this in accordance with the equation shown in FIG. 7, the spherical aberration error can be obtained. In this manner, the above-mentioned Requirement-5 is satisfied.

In addition, since the diffraction efficiency of the hologram element 30b in the blue wavelength $\lambda 1$ is set to the lower rate, i.e., substantially 5%, the 0th-order diffracted light of the irradiated light intensity incident to the detector 22a reproducing the RF signal becomes large, i.e., substantially 90%. Thereby, the Requirement-2 is satisfied, and the S/N of the reproduction signal can be ensured.

Figure 10B:
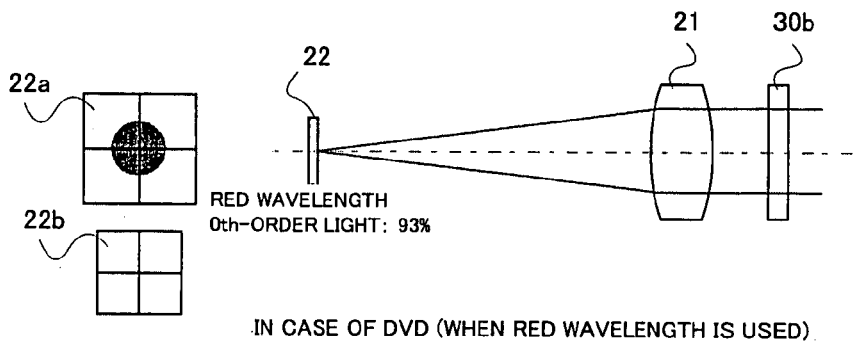
FIG. 10B is a diagram showing such a state that the laser beam of each wavelength is condensed onto the detector by the hologram element of the second embodiment.

(2) When Media Using Red Wavelength $\lambda 2$ (DVD, 660 nm) is Recorded and Reproduced FIG. 10B shows such a state that the red wavelength laser beam is condensed onto the detector by the hologram element 30b of the second embodiment. When the DVD using the red wavelength $\lambda 2$ is recorded and reproduced, the grating depth d is set so that the hologram element 30b does not operate on the reflected light from the disc at all. By adjusting the position of the semiconductor laser in advance, the optical axis of the red wavelength laser beam is made to coincide with the optical axis of the blue wavelength laser beam.

In the hologram element 30b, since the diffraction efficiency of the red wavelength laser beam is set to substantially 0, the laser beam of the red wavelength is not affected by the diffraction effect of the hologram element 30b to be irradiated to the RF signal detector 22a. When the two-wavelength laser is used, the position of the two-wavelength laser is adjusted so that the optical axis of the red wavelength laser beam coincides with the center of the detector 22a. Therefore, there is no problem of the optical axis shift in terms of the red wavelength laser beam.

Figure 10C:
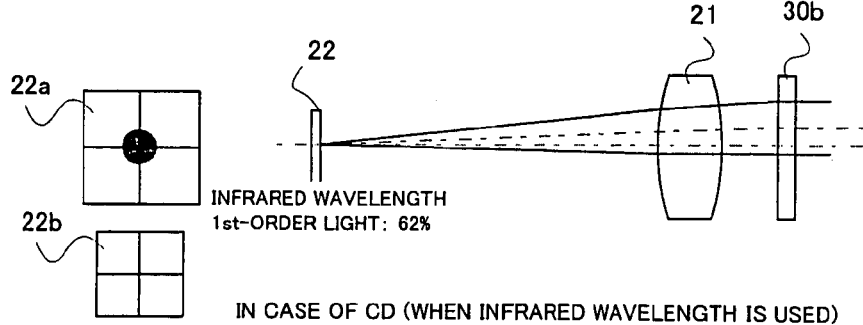
FIG. 10C is a diagram showing such a state that the laser beam of each wavelength is condensed onto the detector by the hologram element of the second embodiment.

(3) When Media Using Infrared Wavelength $\lambda 3$ (CD, 780 nm) is Recorded and Reproduced FIG. 10C shows such a state that the infrared wavelength laser beam is condensed onto the detector by the hologram element 30b of the second embodiment. When the CD using the infrared wavelength is recorded and reproduced, the light flux of the reflected light from the disc, at the position at which the hologram element 30b exists, is on the inner side of the hologram area B. This is because the infrared wavelength used for the CD becomes substantially 53% to the aperture of the BD. This is in such a case that the numerical aperture NA1 of the BD is 0.85 and the numerical aperture NA3 of the CD is 0.45.

The grating depth d of the hologram element in the hologram area B is set so that the 1st-order diffracted light becomes large in the infrared wavelength. Therefore, the light flux (all the light fluxes of the infrared wavelength) of the infrared wavelength transmitting the hologram area B is affected by the deflection effect. Because of the two-wavelength laser, the optical axes of the red wavelength laser beam and the infrared wavelength laser beam are originally shifted by a space between light emitting points. However, the optical axis shift is corrected by the deflection effect of the hologram element 30b, and the 1st-order light of the infrared wavelength laser beam is irradiated to the RF signal detector 22a. Thereby, the Requirement-1 is satisfied. In addition, in the infrared wavelength laser beam, only the 1st-order light of the laser beam irradiated to the hologram element 30b is irradiated to the RF signal detector 22a. Hence, the light intensity irradiated to the detector can be reduced, and the Requirement-4 is satisfied.

Next, a description will be given of a concrete design example of the hologram element 30b according to the second embodiment. The grating pitch p in the hologram area A is set so that the blue wavelength laser beam is not irradiated to the detectors 22a and 22b. The pitch p of the groove in the hologram area B is set so that the optical axis shift between the red wavelength and the infrared wavelength is corrected in the infrared wavelength and the laser beams of both the wavelengths are condensed onto the single RF detector 22a and so that the 0th-order light of the blue wavelength and the 1st-order laser beam are condensed onto the RF detector 22a and the spherical aberration detector 22b, respectively. In this point, the space between the RF signal detector 22a and the spherical aberration detector 22b may be adjusted.

As for the efficiency of the 1st-order diffracted light in each wavelength, the grating depth d of the hologram element 30b is set so that the efficiency of the blue wavelength becomes substantially 5%, the efficiency of the red wavelength becomes substantially 0% and the efficiency of the infrared wavelength becomes 62%. It is assumed that the refractive index of a hologram material in each wavelength is set below.

Blue wavelength: n405=1.619

Red wavelength: n660=1.580

Infrared wavelength: n780=1.574                (Equation 1)

Figure 12A:
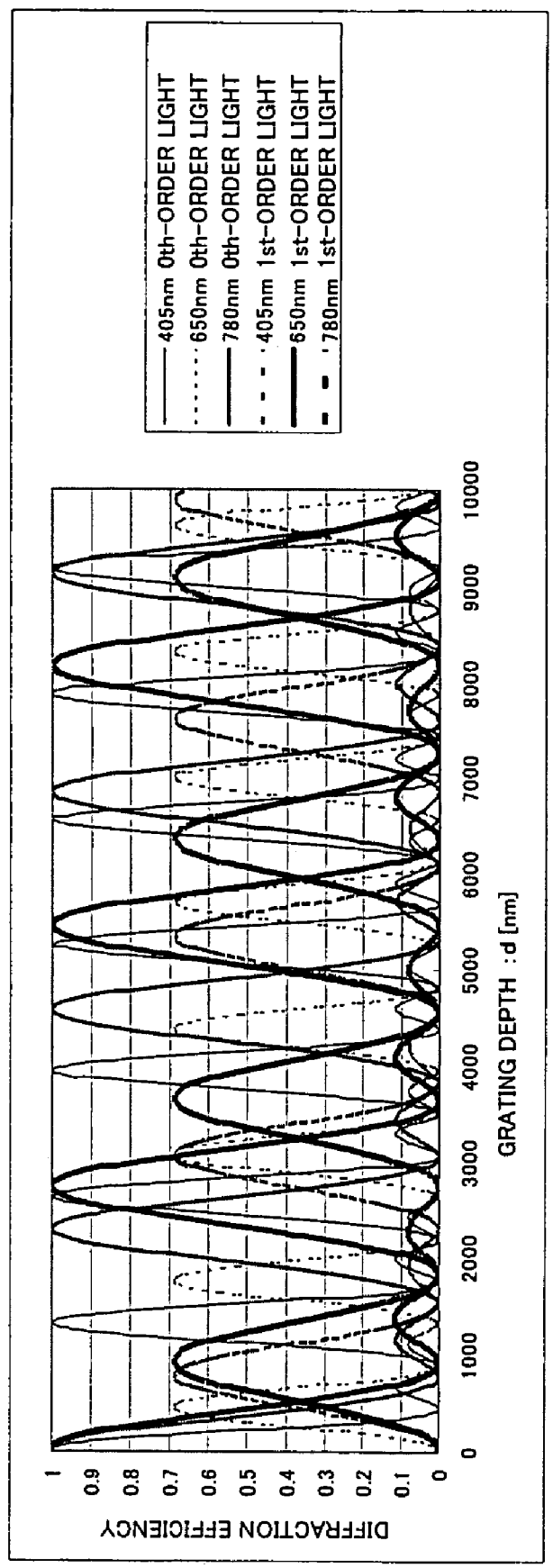
FIG. 12A is a graph showing a relation between the grating depth and the diffraction efficiency of the hologram element, according to the second embodiment.
Figure 12B:
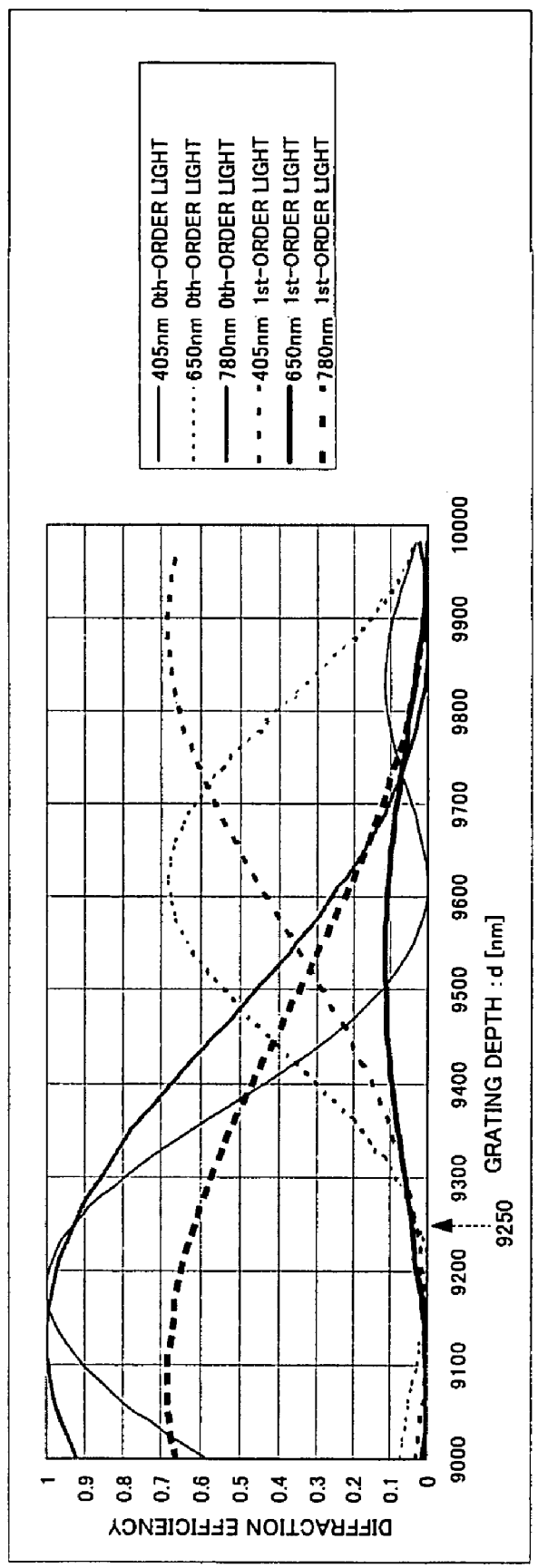
FIG. 12B is a graph showing the relation between the grating depth and the diffraction efficiency of the hologram element, according to the second embodiment.

FIG. 12A is a graph showing a relation between the grating depth d and the diffraction efficiency of the hologram element 30b for the light of each wavelength, and FIG. 12B is a partly-enlarged view thereof. As shown in FIGS. 12A and 12B, by calculating the diffraction efficiency, it becomes clear that the three-level hologram element in which the grating depth d of the hologram element 30b is set within a range of substantially 9180 nm to 9340 nm, preferably set to 9250 nm, is preferably used.

As understood in FIGS. 10A to 10C, there is such an advantage that the irradiation of the unnecessary diffracted light to the detector can be suppressed because the diffracted lights which are not irradiated to any detectors are few in the hologram element of the second embodiment.

As for the hologram element of the second embodiment, most of the 0th-order lights of the red wavelength laser are irradiated to the RF signal detector. By using the filter reducing only the red wavelength laser beam, it also becomes possible to meet the Requirement-3.

Third Embodiment

Figure 14:
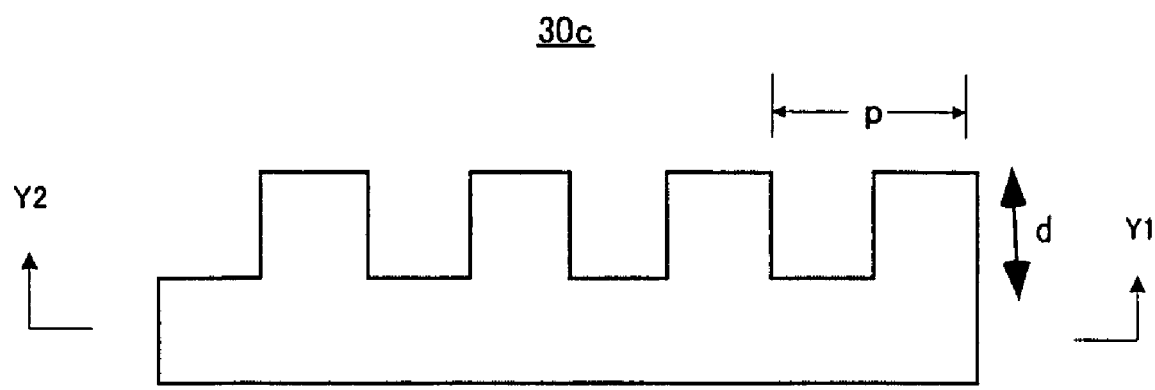
FIG. 14 is a partly-cross-sectional view of the hologram element according to the third embodiment.

Next, a description will be given of the hologram element according to the third embodiment. The third embodiment also enables the spherical aberration detection of the blue wavelength laser beam in addition to the optical axis adjustment of the two-wavelength laser. In the third embodiment, the configuration of the optical pickup itself is same as that shown in FIG. 1, too. In addition, though a basic plane configuration of the hologram element 30c of the third embodiment is similar to the plane configuration of the hologram element 30b of the second embodiment shown in FIG. 9, a cross-sectional configuration of the hologram element 30c of the third embodiment is different from the cross-sectional configuration of the hologram element 30b of the second embodiment, as shown in FIG. 14. The cross-sectional configuration shown in FIG. 14 is obtained by cutting the hologram element 30c having the substantially same plane configuration as the plane configuration of the hologram element 30b shown in FIG. 9 taken along the line Y1-Y2 shown in FIG. 9. The detector 22 includes the RF signal detector 22a and the spherical aberration detector 22b.

A description will be given of the operation of the hologram element 30c in each wavelength with reference to FIGS. 13A to 13C.

(1) When Media Using Blue Wavelength λ1 (BD, 405 nm) is Recorded and Reproduced

Figure 13A:
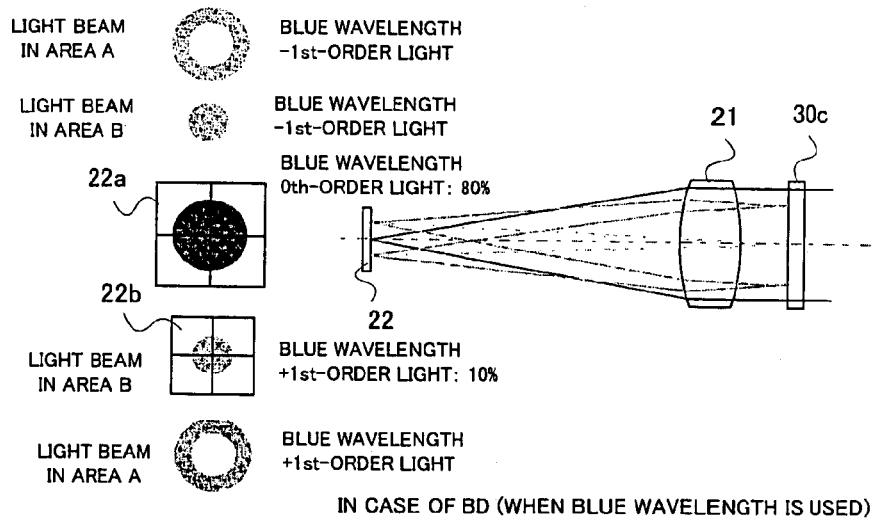
FIG. 13A is a diagram showing such a state that the laser beam of each wavelength is condensed onto the detector by the hologram element of a third embodiment.
Figure 13B:
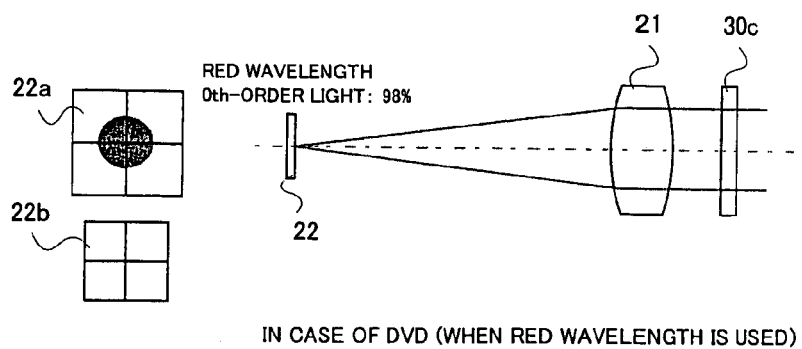
FIG. 13B is a diagram showing such a state that the laser beam of each wavelength is condensed onto the detector by the hologram element of the third embodiment.
Figure 13C:
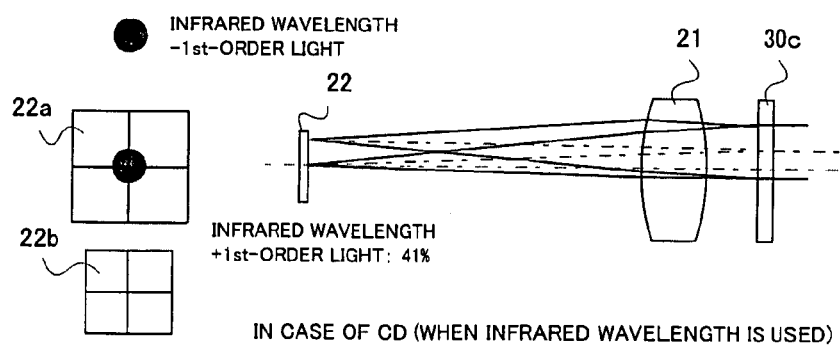
FIG. 13C is a diagram showing such a state that the laser beam of each wavelength is condensed onto the detector by the hologram element of the third embodiment.

FIG. 13A shows such a state that the blue wavelength laser beam is condensed onto the detector by the hologram element 30c of the third embodiment. The reflected light from the disc is divided into five light fluxes by the hologram element 30c. Two of them are the ±1st-order diffracted lights transmitting the hologram area A, two of them are the ±1st-order diffracted lights transmitting the hologram area B, and one of them is the light beam transmitting all the areas. The light beams transmitting the hologram areas A and B, out of the light beams transmitting the hologram element 30c, are symmetrically deflected with respect to the optical axes, respectively. The grating depth d of the hologram element is set so that the ±1st-order diffracted lights become 10% and the 0th-order diffracted light becomes 80%. The +1st-order light transmitting the hologram area B and affected by the deflection effect is irradiated to the spherical aberration detector 22b. The −1st-order light transmitting the hologram area B and affected by the deflection effect is not irradiated to any detectors when the spherical aberration detector therefore is not provided. A detector for the −1st-order light may be provided. The ±1st-order lights transmitting the hologram area A and affected by the deflection effect are not irradiated to any detectors. The 0th-order light affected by no deflection effect is irradiated to the RF signal detector 22a.

In the third embodiment, the spherical aberration can be also detected by using the spherical aberration detector 22a, similarly to the second embodiment. Therefore, the above-mentioned Requirement-5 is satisfied. However, as shown in FIG. 14, in the third embodiment, since the hologram is at the two level, the −1st-order light is also generated. Thus, the spherical aberration detector may be arranged on the side of the −1st-order light. In addition, since the diffraction efficiency of the hologram element 30c in the blue wavelength λ1 is set to the lower value, the light intensity of the 0th-order diffracted light irradiated to the RF signal detector 22a becomes large (80%). Therefore, the S/N of the reproduction signal can be ensured. Thereby, the Requirement-2 is satisfied.

(2) When Media Using Red Waveform λ2 (DVD, 660 nm) is Recorded and Reproduced

When the media using the red wavelength is recorded and reproduced, the grating depth d of the hologram element 30c is set so that the reflected light from the disc does not receive any effect. By adjusting the position of the semiconductor laser in advance, the laser beam of the red wavelength is made to coincide with the optical axis of the blue wavelength. This is the same as the case of the second embodiment.

Since the diffraction efficiency in the red wavelength λ2 is set to substantially 0 in the hologram element 30c, the laser beam of the red wavelength is not affected by the diffraction effect and irradiated to the RF signal detector 22a. Even when the two-wavelength laser is used, the position of the semiconductor laser is adjusted so that the optical axis of the red wavelength laser beam is positioned at the center of the RF signal detector 22a. Thus, the problem of the optical axis shift does not occur to the red wavelength laser beam.

(3) When Media Using Infrared Wavelength λ3 (CD, 780 nm) is Recorded and Reproduced When the media using the infrared wavelength λ3 is recorded and reproduced, similarly to the second embodiment, the light flux of the reflected lights from the disc at the position at which the hologram element 30c exists is on the inner side of the hologram area B. The grating depth d of the hologram area B is set so that the ±1st-order diffracted light becomes large in the infrared wavelength. Therefore, the light flux (all the light fluxes of the infrared wavelength) of the infrared wavelength transmitting the hologram area B is affected by the deflection effect. Since the two-wavelength laser is used, the optical axes of the red wavelength laser beam and the infrared wavelength laser beam are originally shifted by the space between the light emitting points. Therefore, the optical axis shift of the +1st-order diffracted light is corrected by the deflection effect of the hologram element 30c, and the +1st-order diffracted light is irradiated to the RF signal detector 22a. The −1st-order diffracted light is not irradiated to any detectors. However, the detector for the −1st-order light may be provided.

Arrangement of the two-wavelength laser is adjusted so that the red wavelength laser beam is condensed at the center of the detector 22a. Thereby, the optical axis of the laser beam of the infrared wavelength is shifted. The hologram element 30c has such an operation that the optical axis of the infrared wavelength laser beam is condensed onto the RF signal detector 22a. The laser beam condensed onto the detector 22a is the +1st-order light, and the light intensity is 41% of the entire light intensity as shown in FIG. 13C. Therefore, the light intensity condensed onto the RF signal detector 22a can be reduced. Thereby, the Requirement-4 is satisfied.

Next, a description will be given of the concrete design example of the hologram element 30c according to the third embodiment. The pitches p of the grooves in the hologram areas A and B are set similarly to the second embodiment.

Figure 15A:
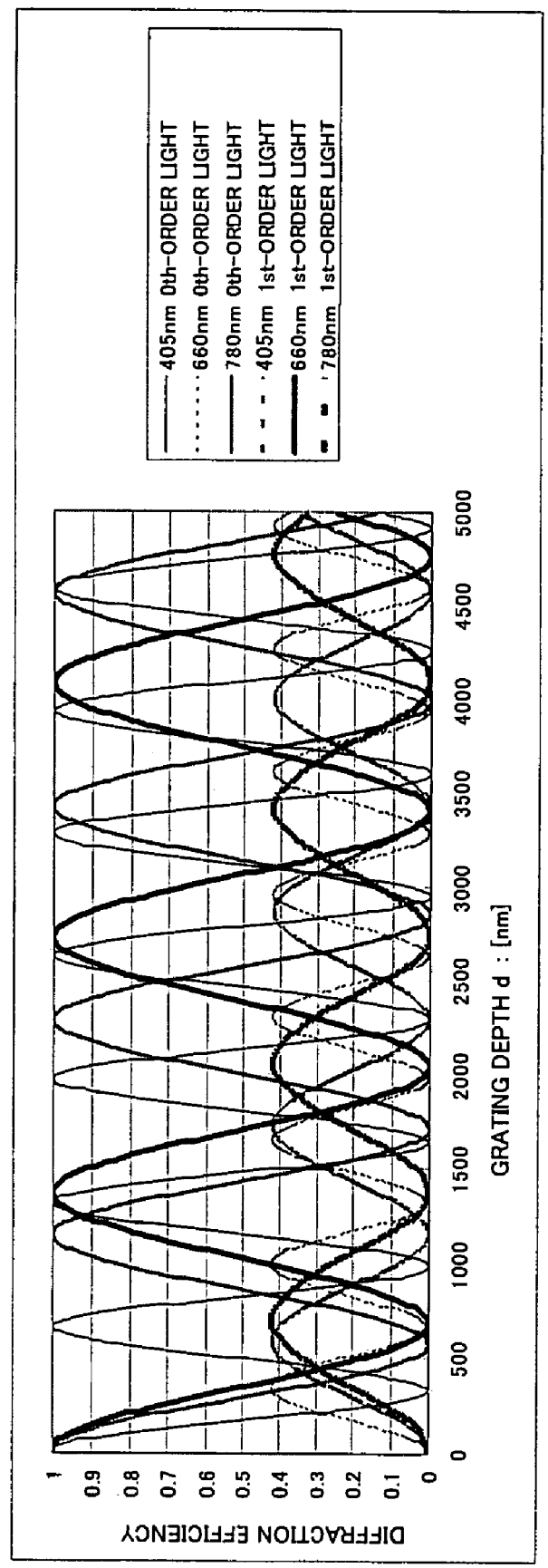
FIG. 15A is a graph showing a relation between the grating depth and the diffraction efficiency of the hologram element, according to the third embodiment.
Figure 15B:
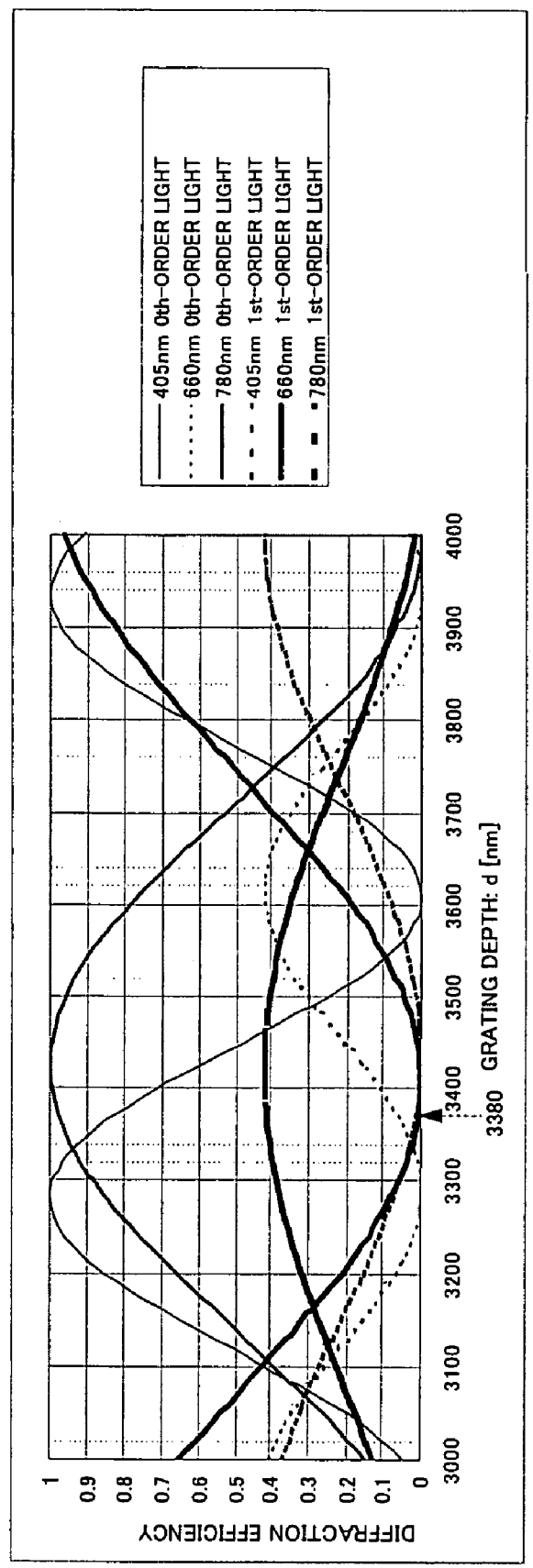
FIG. 15B is a graph showing a relation between the grating depth and the diffraction efficiency of the hologram element according to the third embodiment.

The grating depth d of the hologram element is set so that, as for the efficiency of the ±1st-order diffracted lights in each wavelength, that of the blue wavelength λ1, that of the red wavelength λ2 and that of the infrared wavelength λ3 become substantially 10%, 0% and 41%, respectively. It is assumed that the refractive index of the hologram material in each wavelength is set as shown in the Equation 1. FIG. 15A is a graph showing a relation between the grating depth d of the hologram element 30c and the diffracted light for each wavelength light, and FIG. 15B is a partly-enlarged view thereof. As shown in FIGS. 15A and 15B, by calculating the diffraction efficiency, it becomes clear that the two-level hologram in which the grating depth d of the hologram element 30c is set within a range of substantially 3280 to 3400 nm, preferably set to 3380 nm, is preferably used.

In the hologram element of the third embodiment, the diffracted light of the blue wavelength laser beam becomes large, as compared with the second embodiment. However, from such points that the hologram element may be of two levels (of three levels in the second embodiment) and that the grating depth may be 3380 nm, which is shallow, (9250 nm in the second embodiment), the manufacture of the hologram element is advantageously easy.

In the hologram element of the third embodiment, most of the 0th-order light of the red wavelength laser is irradiated to the RF signal detector. By using the filter reducing only the red wavelength laser beam, it becomes possible to meet the Requirement-3.

Fourth Embodiment

Figure 17:
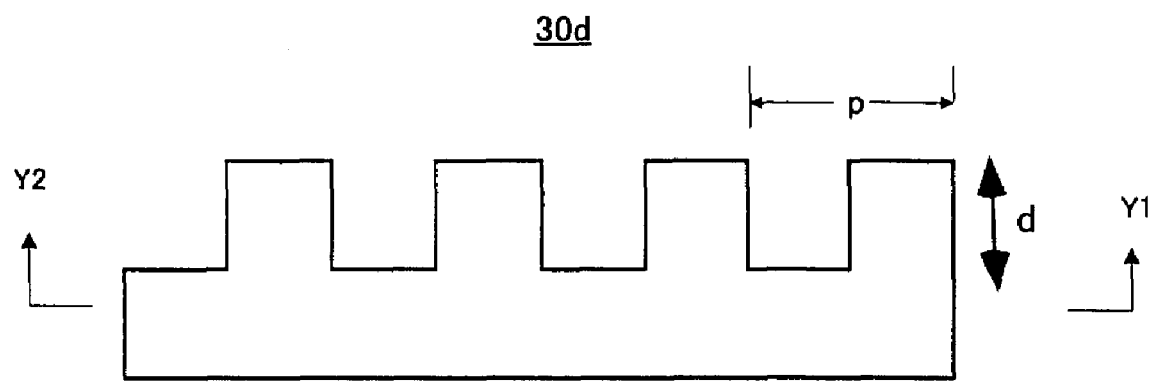
FIG. 17 is a partly-cross-sectional view of the hologram element according to the fourth embodiment.

Next, a description will be given of the hologram element according to a fourth embodiment. The fourth embodiment also enables the detection of the spherical aberration of the blue wavelength laser beam, in addition to the optical axis adjustment of the two-wavelength laser. In the fourth embodiment, the configuration of the optical pickup itself is similar to that shown in FIG. 1. In addition, the basic plane configuration and the cross-sectional configuration of the hologram element 30d according to the fourth embodiment are similar to those of the hologram element 30c of the third embodiment shown in FIG. 14. The cross-sectional configuration shown in FIG. 17 is obtained by cutting, along the line Y1-Y2 shown in FIG. 9, the hologram element 30d having the substantially same plane configuration as that of the hologram element 30b shown in FIG. 9. The detectors include the RF signal detector 22a and the spherical aberration detector 22b.

Next, a description will be given of the operation of the hologram element 30c in each wavelength, with reference to FIGS. 16A to 16C.

(1) When Media Using Blue Wavelength λ1 (BD, 405 nm) is Recorded and Reproduced

Figure 16A:
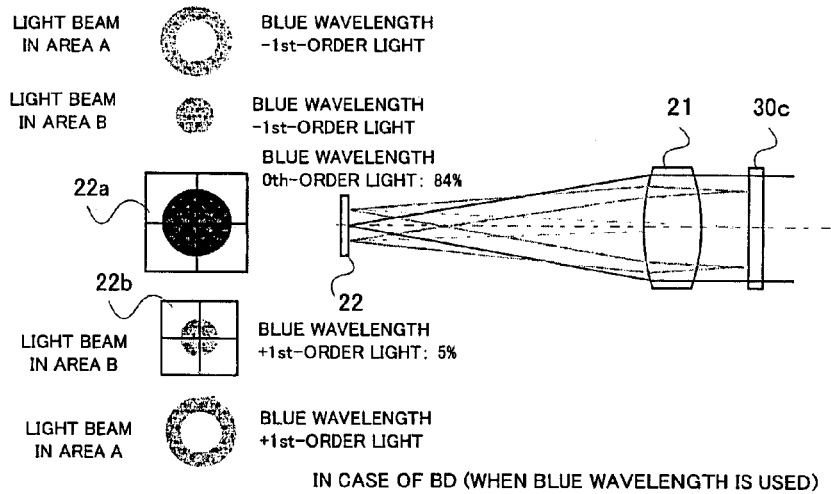
FIG. 16A is a diagram showing such a state that the laser beam of each wavelength is condensed onto the detector by the hologram element of a fourth embodiment.

FIG. 16A shows such a state that the blue wavelength laser beam is condensed onto the detector by the hologram element 30d of the fourth embodiment. As for the operation of the hologram element, the hologram element 30d of the fourth embodiment is similar to the hologram element 30c of the third embodiment. However, the grating depth d of the hologram element 30d of the fourth embodiment is set so that the ±1st-order diffracted lights and the 0th-order light are 5% and 84% of the entire light intensity, respectively. The configurations of the RF signal detector 22a and the spherical aberration detector 22b are similar to those of the third embodiment.

In the fourth embodiment, the spherical aberration can be also detected similarly to the second embodiment. Thus, the above-mentioned Requirement-5 is satisfied. In the fourth embodiment, since the hologram is of two levels as shown in FIG. 17, the −1st-order light is also generated. Thus, the detector may be arranged on the side of the −1st-order light. Additionally, since the diffraction efficiency of the hologram element 30d in the blue wavelength λ1 is set to the lower value, the light intensity of the 0th-order diffracted light irradiated to the RF signal detector 22a becomes large (84%), and the S/N of the reproduction signal can be ensured. Thereby, the Requirement-2 is satisfied.

(2) When Media Using Red Wavelength λ2 (DVD, 660 nm) is Recorded and Reproduced

Figure 16B:
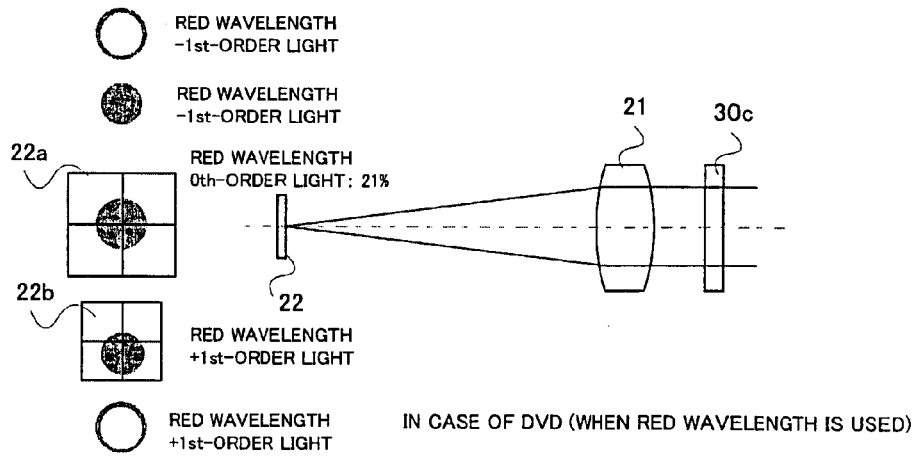
FIG. 16B is a diagram showing such a state that the laser beam of each wavelength is condensed onto the detector by the hologram element of the fourth embodiment.

FIG. 16B shows such a state that the red wavelength laser beam is condensed onto the detector by the hologram element 30d of the fourth embodiment. The reflected light from the disc is divided into five light fluxes by the hologram element 30d. Two of them are the ±1st-order diffracted lights transmitting the hologram area A, other two of them are the ±1st-order diffracted lights transmitting the hologram area B, and the last one is the light beam transmitting the entire areas. The light beams transmitting the hologram areas A and B, out of the light beams transmitting the hologram element 30d, are symmetrically deflected with respect to the optical axes, respectively. The grating depth d of the hologram element is set so that each the ±1st-order diffracted lights is 33% and the 0th-order light is 21%. The +1st-order diffracted light transmitting the hologram area B and receiving the deflection effect is irradiated to the vicinity of the spherical aberration detector 22b. However, since the spherical aberration is not detected in the red wavelength laser beam, the light beam is not particularly used. The −1st-order light transmitting the hologram area B and receiving the deflection effect is not irradiated to any detectors when the spherical aberration detector for the light is not provided. The ±1st-order lights transmitting the hologram area A and receiving the deflection effect are not irradiated to any detectors. The 0th-order light receiving no deflection effect is irradiated to the RF signal detector 22a. When the red wavelength $\lambda 2$ is used, the light intensity irradiated to the RF signal detector 22a can be reduced.

As for the hologram element 30d of this embodiment, since the diffraction efficiency in the red wavelength $\lambda 2$ is set large, the light intensity of 0th-order light is reduced to 21%. As a result, the light intensity condensed onto the RF signal detector 22a can be reduced. Thereby, it can be prevented that the red wavelength laser beam is saturated on the RF signal detector, and the Requirement-3 is satisfied. Even when the two-wavelength laser is used, the position of the semiconductor laser is adjusted so that the optical axis of the red wavelength laser beam is positioned at the center of the RF signal detector 22a. Therefore, there occurs no problem of the optical axis shift as for the red wavelength laser.

Figure 16C:
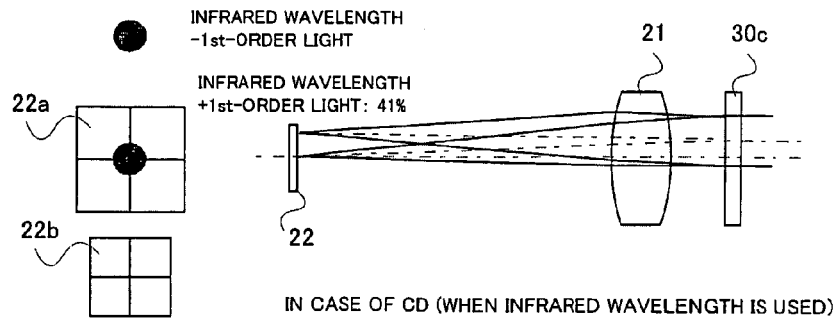
FIG. 16C is a diagram showing such a state that the laser beam of each wavelength is condensed onto the detector by the hologram element of the fourth embodiment.

(3) When Media Using Infrared Wavelength $\lambda 3$ (CD, 780 nm) is Recorded and Reproduced FIG. 16C shows such a state that the red wavelength laser beam is condensed onto the detector by the hologram element 30d of the fourth embodiment. The operation of the hologram element 30d in this case is similar to that of the third embodiment.

In arranging the two-wavelength laser, since the optical axis is adjusted with respect to the red wavelength $\lambda 2$, the optical axis of the infrared wavelength $\lambda 3$ is shifted. The hologram element 30d has such a deflection effect that the optical axis of the infrared wavelength $\lambda 3$ is condensed onto the RF signal detector 22a. The light beam condensed onto the RF signal detector is the +1st-order light. The light intensity irradiated to the RF signal detector 22a is 41% of the entire light intensity. In this manner, since the light intensity condensed onto the RF signal detector 22a can be reduced, the Requirement-4 is satisfied.

Next, a description will be given of the concrete design example of the hologram element 30d according to the fourth embodiment. The pitches p of the grooves in the hologram areas A and B are set similarly to those in the second embodiment.

Figure 18A:
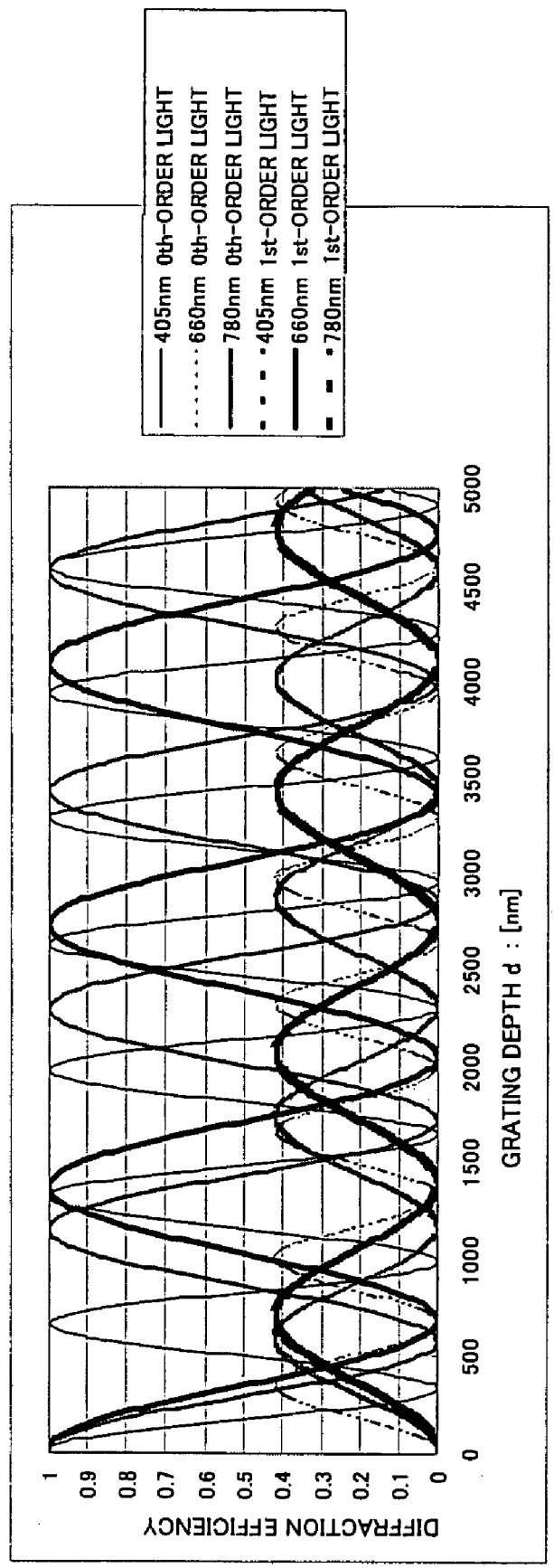
FIG. 18A is a graph showing a relation between the grating depth and the diffraction efficiency of the hologram element, according to the fourth embodiment.

The hologram depth is set so that, as for the efficiency of the ±1st-order diffracted lights in each wavelength, that of the blue wavelength $\lambda 1$, that of the red wavelength $\lambda 2$ and that of the infrared wavelength $\lambda 3$ are substantially 5%, 33% and 41%, respectively. It is assumed that the refractive index of the hologram material in each wavelength is set to the value shown by the Equation 1. FIG. 18A is a graph showing a relation between the grating depth d and the diffraction efficiency of the hologram element 30d of the light of each wavelength, and FIG. 18B is a partly-enlarged view thereof.

Figure 18B:
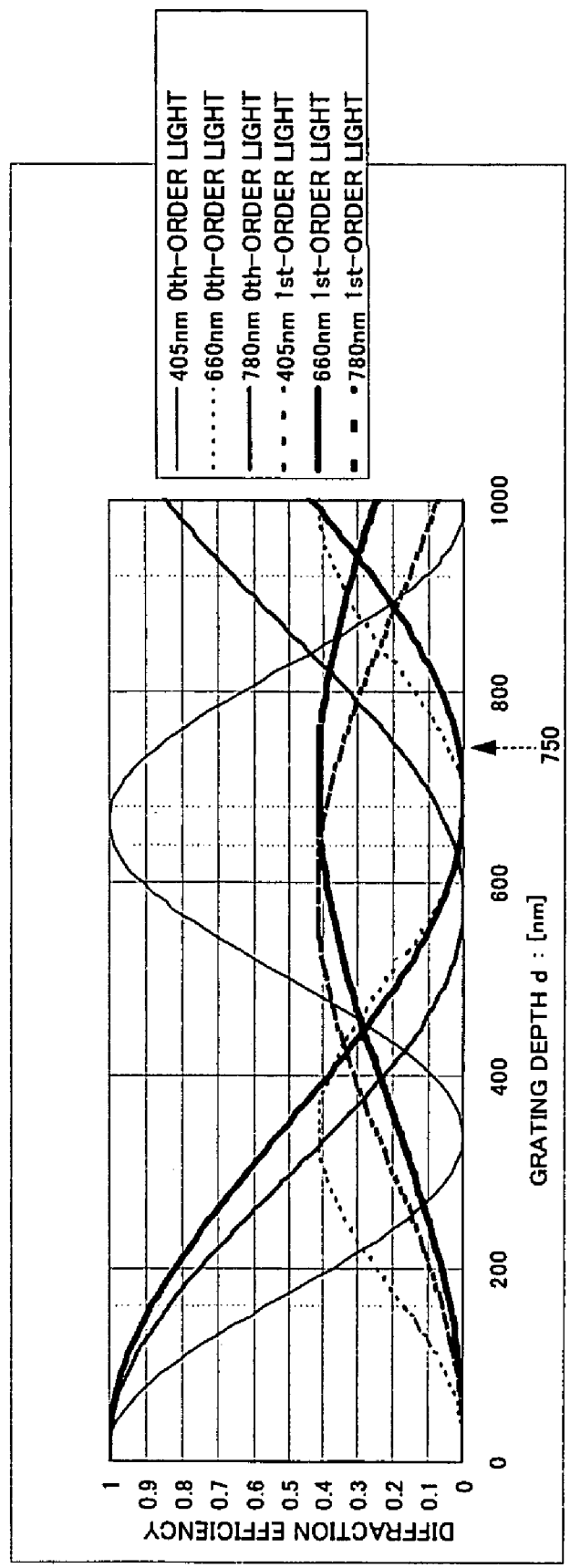
FIG. 18B is a graph showing a relation between the grating depth and the diffraction efficiency of the hologram element, according to the fourth embodiment.

As shown in FIGS. 18A and 18B, by calculating the diffraction efficiency, it becomes clear that the two-level hologram in which the grating depth d of the hologram element is set within a range of substantially 680 to 800 nm, preferably set to 750 nm, is preferably used.

In the hologram element of the fourth embodiment, the red wavelength laser can be reduced without using a dedicated filter. In addition, since the grating depth of the hologram element is very shallow (750 nm) as compared with those of the second and third embodiments, the manufacture is advantageously quite easy.

Fifth Embodiment

Next, a description will be given of the hologram element according to a fifth embodiment. The hologram element according to the fifth embodiment has a function to correct color aberration generated in the detecting optical system at the time of using the infrared wavelength. Also, the hologram element has a function to correct the optical axis shift on the detector 22 between the optical axes of the laser beams of the blue wavelength and the red wavelength and the optical axis of the laser beam of the infrared wavelength. In addition, the hologram element enables the focus error detection by the differential spot size method at the time of using the red wavelength laser beam.

Figure 19A:
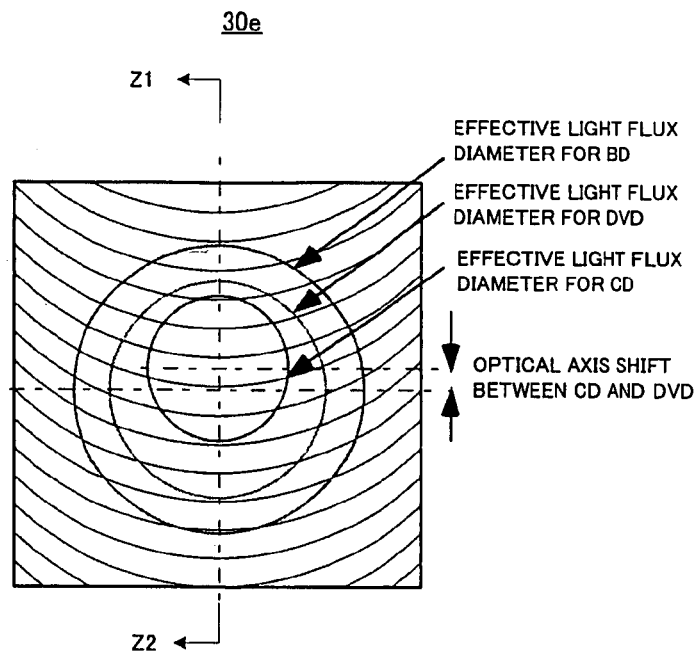
FIG. 19A is a plane view of the hologram element according to a fifth embodiment.
Figure 21:
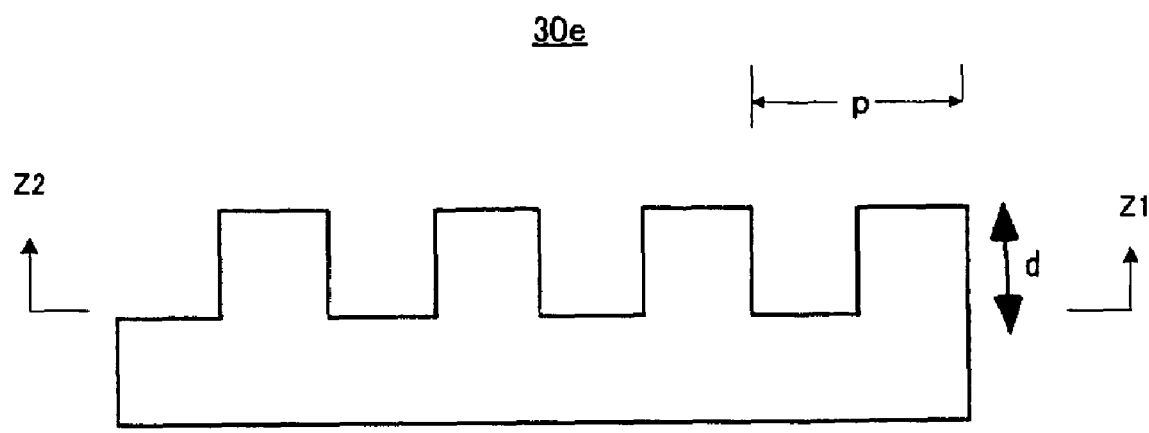
FIG. 21 is a partly-cross-sectional view of the hologram element according to the fifth embodiment.

FIG. 19A is a plane view of a hologram element 30e according to the fifth embodiment, and FIG. 21 is a partly-cross-sectional view of the hologram element 30e taken along a line Z1-Z2 shown in FIG. 19A.

Figure 19B:
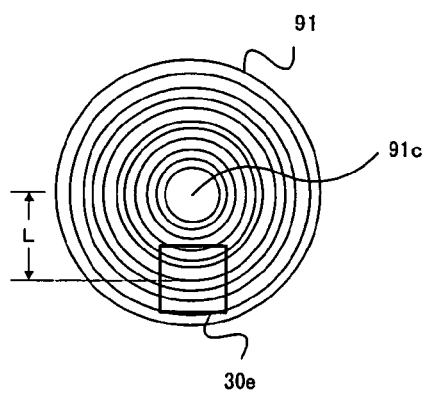
FIG. 19B is a plane view of the hologram element according to the fifth embodiment.

As shown in FIG. 19A, the hologram element 30e has plural circular-arc diffraction grating shape. The circular-arc diffraction grating shape is a part of a diffraction grating 91 formed into circular-arcs shape of plural concentric-circles shown in FIG. 19B, and is formed by a part eccentric with respect to a center 91c of the concentric-circles by a predetermined eccentricity amount L. In this manner, by using the part of the diffraction grating shape formed into the plural circular-arc shapes, the hologram element 30e has a lens effect (a projecting lens effect and a recessed lens effect), by which the color aberration generated in the detecting optical system at the time of using the infrared wavelength $\lambda 3$ can be corrected. Additionally, the eccentricity amount L corresponds to the optical shift amount on the detector 22 between the optical axes of the laser beams of the blue wavelength $\lambda 1$ and the red wavelength $\lambda 2$ and the optical axis of the laser beam of the infrared wavelength $\lambda 3$.

The pitch of the hologram element 30e shown in FIG. 21 is determined as the size correcting the optical axis shift on the detector 22 between the laser beams of the blue wavelength $\lambda 1$ and the red wavelength $\lambda 2$ and the laser beam of the infrared wavelength $\lambda 3$. In addition, the grating depth d is determined such that no diffracted light is generated at the blue wavelength $\lambda 1$ (i.e., only the 0th-order light is generated), the efficiency of the 0th-order light is reduced and the ±1st-order lights are irradiated to the detector for the spot size method, which will be described later, at the red wavelength $\lambda 2$, and the efficiency of the ±1st-order lights becomes high at the infrared wavelength $\lambda 3$.

Now, a description will be given of the operation of the hologram element 30e in each wavelength, with reference to FIGS. 20A to 20C.

Figure 20A:
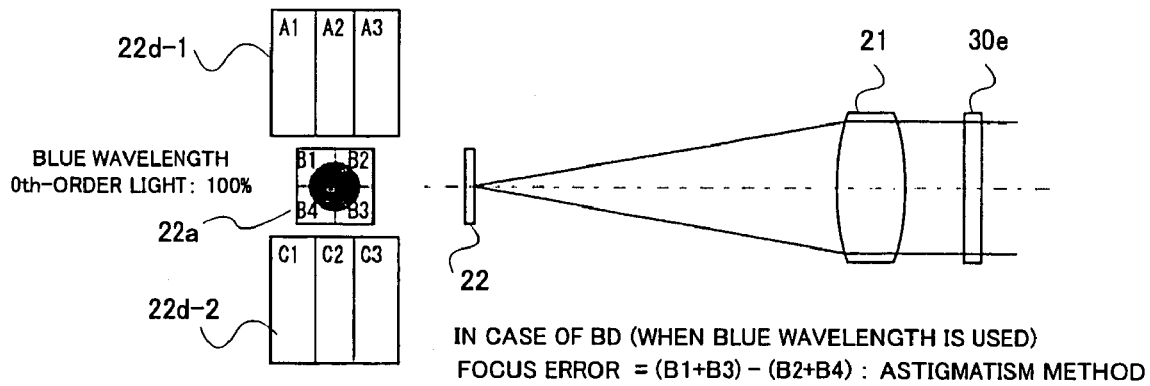
FIG. 20A is a diagram showing such a state that the laser beam of each wavelength is condensed onto the detector by the hologram element of the fifth embodiment.

(1) When Media Using Blue Wavelength $\lambda 1$ (BD, 405 nm) is Recorded and Reproduced FIG. 20A shows such a state that the blue wavelength laser beam is condensed onto the detector by the hologram element 30e of the fifth embodiment. As shown in FIG. 20A, the blue wavelength laser beam passes through the hologram element 30e to be condensed onto the detector 22 by the condensing lens 21. As shown on the left side of FIG. 20A, the light-detecting surface of the RF signal detector 22 is divided into four parts, and the spot of the blue wavelength laser beam is formed at a substantial center thereof.

As for the blue wavelength, since the sensitivity of the detector is low in theory, it is necessary to regard the S/N as important. Therefore, it is necessary to enhance the efficiency of the detecting system and increase the light intensity irradiated to the detector as much as possible. Then, the hologram element 30e is formed to have no effect on the blue wavelength laser beam or to suppress the generation of the diffracted light as much as possible.

As for the blue wavelength, the detector 22 is used, and a focus error signal can be obtained in accordance with an arithmetic equation shown in FIG. 20A by the astigmatism method.

(2) When Media Using Red Waveform λ2 (DVD, 660 nm) is Recorded and Reproduced

Figure 20B:
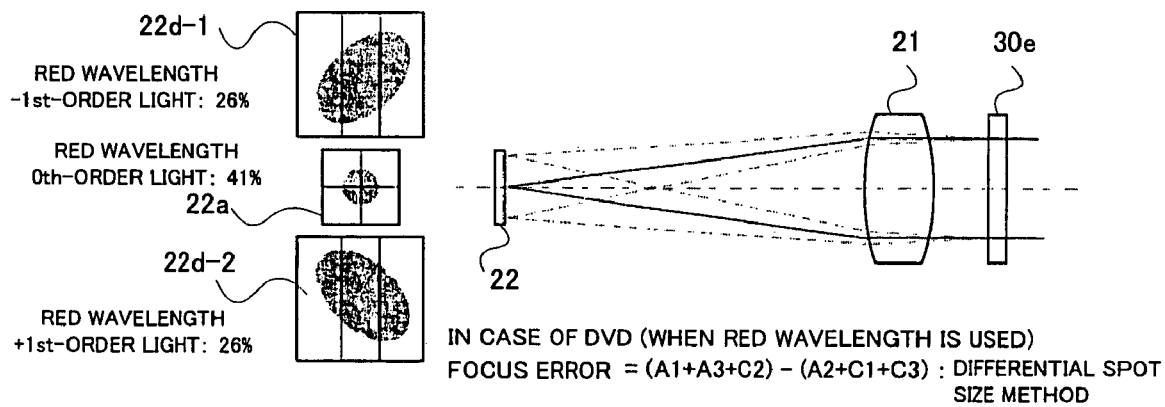
FIG. 20B is a diagram showing such a state that the laser beam of each wavelength is condensed onto the detector by the hologram element of the fifth embodiment.

FIG. 20B shows such a state that the red wavelength laser beam is condensed onto the detector by the hologram element 30e of the fifth embodiment. As shown in FIG. 20B, the hologram element 30e generates the ±1st-order lights of the red wavelength laser beam. In the red wavelength, since the sensitivity of the detector is high and the light intensity at the time of the recording and reproduction is also large, it is necessary to lower the efficiency of the detecting system and reduce the light intensity irradiated to the detector 22 in order to prevent saturation of the light-detecting element of the detector 22. Thus, the ±1st-order lights are generated by the hologram element 30e, the light intensity of the 0th-order light irradiated to the detector 22 is reduced by the amount of the ±1st-order lights.

In addition, in the fifth embodiment, the focus error detection by the differential spot size method is performed by using the ±1st-order lights of the red wavelength laser beam. The differential spot size method is a focus error detecting system capable of canceling the effect (track cross noise) of the diffracted light from the track mixed to the focus error signal. The track cross noise is remarkably generated on the disc having the land/groove recording structure. An example of the disc employing the land/groove recording structure is a DVD-RAM. Therefore, when the DVD-RAM is reproduced, it is extremely effective to use the differential spot size method as the focus error detecting system. The fifth embodiment makes it possible.

Figure 20C:
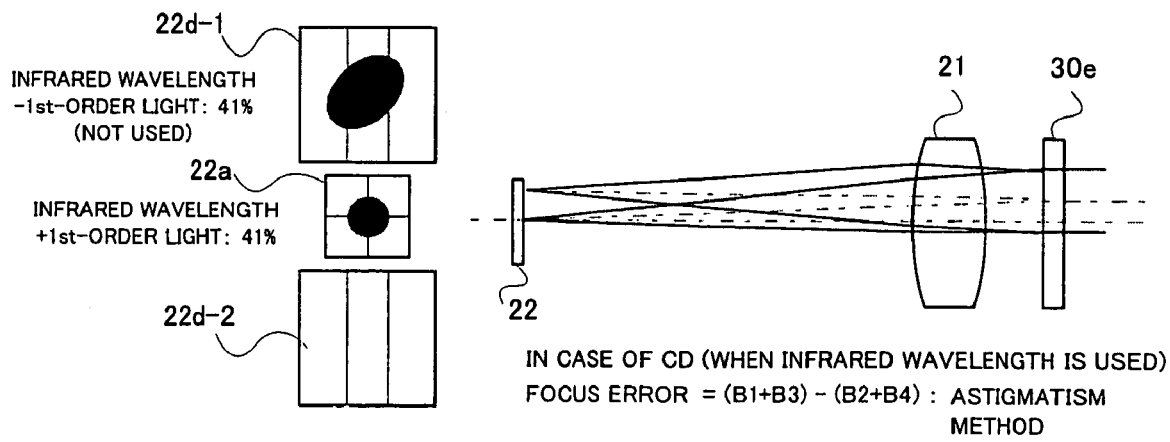
FIG. 20C is a diagram showing such a state that the laser beam of each wavelength is condensed onto the detector by the hologram element of the fifth embodiment.

As shown in FIGS. 20A to 20C, a pair of triple detectors 22d-1 and 22d-2 is used in the differential spot size method. The +1st-order light of the red wavelength laser beam is condensed onto a position on the near side of the focus position of the 0th-order light by the projecting lens effect of the hologram element 30e, and the optical axis is deflected by the eccentricity of the hologram element 30e. In addition, the −1st-order light of the red wavelength laser beam is condensed onto a position on the far side of the focus position of the 0th-order light by the recessed lens effect of the hologram element 30e, and the optical axis is deflected by the eccentricity of the hologram element 30e. Thereby, the ±1st-order lights of the red wavelength laser are irradiated to the detectors 22d-1 and 22d-2 for the differential spot size method, respectively. As shown in FIG. 20A, it is prescribed that the light-detecting surfaces of the detectors 22d-1 and 22d-2 are A1 to A3 and C1 to C3, respectively. Then, the focus error signal by the differential spot size method can be obtained by an arithmetic equation shown in FIG. 20B. The RF signal detector 22a is used for the generation of the RF signal and the tracking error signal.

(3) When Media Using Infrared Wavelength λ3 (CD, 780 nm) is Recorded and Reproduced FIG. 20C shows such a state that the infrared wavelength laser beam is condensed onto the detector by the hologram element 30e of the fifth embodiment. As shown in FIG. 20C, the hologram element 30e generates only the ±1st-order lights of the infrared wavelength laser beam and irradiates the +1st-order light or the −1st-order light to the detector 22. Thereby, it becomes possible to correct the optical axis shift when the two-wavelength laser is used.

When the two-wavelength laser emitting the laser beams of the red wavelength and the infrared wavelength is used, the adjustment of the optical system of the optical pickup is usually executed with respect to the red wavelength. Since the laser beam of the infrared wavelength passes through the optical system adjusted with respect to the red wavelength, the color aberration is generated in the detecting optical system. The hologram element 30e according to the fifth embodiment operates as the projecting lens or the recessed lens, which corrects the color aberration. Concretely, the hologram element 30e operates on one of ±1st-order lights of the infrared wavelength laser beam as the projecting lens or the recessed lens, and corrects the color aberration to irradiate the corrected 1st-order light to the detector 22. In this manner, the color aberration is corrected. Conversely, the color aberration is added to the other 1st-order light by the hologram element 30e and is deflected in the symmetry direction with respect to the original optical axis. However, the light beam is not used.

FIG. 21 shows a configuration example of the hologram element 30e realizing the above-mentioned functions. This example is the two-level hologram having the single grating depth d, and has the same configuration as that of the hologram element 30a of the first embodiment shown in FIG. 4A.

As shown in FIG. 21, the grating depth d(=1970 nm) of the hologram element 30e corresponds to the amount of three wavelengths (λ3) to the blue wavelength laser beam. Therefore, the ±1st-order lights (diffracted lights) are not generated in the blue wavelength laser beam, and the 0th-order light becomes 100%. Hence, the blue wavelength laser beam irradiated to the detector 22 can be maximum. Thereby, the Requirement-2 is satisfied.

The grating depth d of the hologram element 30e corresponds to the amount of 1.89 wavelengths with respect to the red wavelength laser beam, and the 0th-order light of substantially 41% and the ±1st-order lights of substantially 26% are generated. Hence, the red wavelength laser beam irradiated to the detector 22 can be reduced to 41%, and the saturation of the detector can be prevented. Thereby, the Requirement-3 is satisfied.

The grating depth d of the hologram element 30e corresponds to the amount of 1.60 wavelengths with respect to the infrared wavelength laser beam, and the 0th-order light of 3% and the ±1st-order lights of 41% are generated. Namely, substantially only ±1st-order lights can be generated and irradiated to the detector 22. Thereby, it becomes possible to correct the optical axis shift of the infrared wavelength laser caused due to using the two-wavelength laser, and the Requirement-1 is satisfied. In addition, the light intensity irradiated to the detector 22 can be reduced, and the Requirement-4 is satisfied.

Further, as described above, in the fifth embodiment, the hologram element 30e has a function to correct the color aberration generated in the laser beam of the infrared wavelength. Particularly, since the hologram element 30e of this embodiment is inserted into the detecting optical system (in the path of the return light from the disc, i.e., return path), the color aberration generated in the detecting optical system can be corrected. In this point, in the above-mentioned Reference-3, since the optical element having the function of the color aberration correction is arranged on the going path (i.e., the path from the laser beam source to the disc) of the laser beam, the color aberration generated in the detecting optical system (i.e., in the return path) cannot be corrected. By the hologram element 30e according to the fifth embodiment, the color aberration can be corrected in the detecting optical system in the infrared wavelength (CD). Therefore, the laser spot on the detector can be formed into an ideal shape (circle) in such a state that the laser beam focuses on the disc surface. Therefore, it is unnecessary to give the electric focus offset, and it is advantageous that no adverse effect occurs to tracking error detection by a push-pull method.

In addition, as shown in FIG. 20B, the hologram element 30e of the fifth embodiment simultaneously realizes a function to reduce the light intensity irradiated to the RF signal detector 22 in the red wavelength and a function to divide the light flux of the red wavelength in order to realize the diffracted spot size method. Therefore, it becomes possible to realize the stable focus servo which is not affected by any cross track noise on the disc executing land/groove recording, such as a DVD-RAM.

INDUSTRIAL APPLICABILITY

This invention can be used for the information recording apparatus, the information reproduction apparatus and the information recording and reproduction apparatus capable of recording the information on the recording medium and/or capable of reproducing the information from the recording medium by irradiating the laser beam.

The invention claimed is:

1. An optical pickup comprising:
a light source which emits a light of a first wavelength;
a two-wavelength light source which emits lights of second and third wavelengths;
a light irradiating unit which irradiates the lights of the first to third wavelengths on a recording medium;
a single light-detecting element which receives reflected lights of the lights of the first to third wavelengths by the recording medium; and
a hologram element which is arranged between the light irradiating unit and the light-detecting element and in a path through which only a returned light from the recording medium passes, and which has a different optical effect on each of the lights of the first to third wavelengths.

2. The optical pickup according to claim 1,
wherein the two-wavelength light source emits the lights of the second and third wavelengths from different emitting points; and
wherein the hologram element introduces 0th-order lights of the lights of the first and second wavelengths to a center of the light-detecting element and introduces a diffracted light of the light of the third wavelength to the center of the light-detecting element.

3. The optical pickup according to claim 2, wherein the hologram element diffracts the light of the second wavelength and introduces a 0th-order light of light intensity smaller than light intensity irradiated to the hologram element to the light-detecting element.

4. The optical pickup according to claim 2, wherein the hologram element diffracts the light of the third wavelength and introduces a 1st-order light of light intensity smaller than light intensity irradiated to the hologram element to the light-detecting element.

5. The optical pickup according to claim 2, wherein the hologram element transmits the light of the first wavelength and introduces a 0th-order light of light intensity equal to light intensity irradiated to the hologram element to the light-detecting element.

6. The optical pickup according to claim 1, wherein the hologram element includes an inner area formed into a circle and an outer area formed in a concentric circle with the inner area in an outer circumference of the inner area, and divides the light irradiated to the hologram into a light passing through the inner area and a light passing through the outer area.

7. The optical pickup according to claim 6, wherein a radius of the inner area is substantially 70% of a light flux diameter formed in such a case that a light of a shortest wavelength of the first to third wavelengths is irradiated to the hologram element.

8. The optical pickup according to claim 6, further comprising a spherical aberration detecting light-detecting element which is provided separately from the light-detecting element, wherein the inner area of the hologram element diffracts a light of a shortest wavelength of the first to third wavelengths and introduces a diffracted light to the spherical aberration correcting light-detecting element.

9. The optical pickup according to claim 6, wherein the inner area and the outer area of the hologram element are formed by gratings having same depths and different pitches.

10. The optical pickup according to claim 2, wherein the hologram element has a lens effect and a deflection effect to the light of the second wavelength and generates ±1st-order lights of the light of the second wavelength and reduces light intensity of the 0th-order light of the light of the second wavelength.

11. The optical pickup according to claim 2, wherein the hologram element corrects an optical axis shift between the lights of the first and second wavelengths and the light of the third wavelength irradiated to the light-detecting element, and corrects a color aberration generated in the light of the third wavelength.

12. The optical pickup according to claim 11, wherein the hologram element is a part of a diffraction grating formed into a circular-arc shape of plural concentric circles, and is formed by a part eccentric with respect to a center of the concentric circles by amount corresponding to correction amount of the optical axis shift.

13. The optical pickup according to claim 1, wherein the first wavelength is shorter than the second wavelength, and the second wavelength is shorter than the third wavelength.

* * * * *